US012633615B1

(12) United States Patent
Liu

(10) Patent No.: US 12,633,615 B1
(45) Date of Patent: May 19, 2026

(54) HANDHELD MOBILE DEVICE

(71) Applicant: Yao Liu, Shenzhen (CN)

(72) Inventor: Yao Liu, Shenzhen (CN)

( * ) Notice: Subject to any disclaimer, the term of this patent is extended or adjusted under 35 U.S.C. 154(b) by 0 days.

(21) Appl. No.: 19/177,657

(22) Filed: Apr. 14, 2025

(51) Int. Cl.

| | |
|---|---|
| *H01M 50/296* | (2021.01) |
| *A61H 7/00* | (2006.01) |
| *F21L 4/08* | (2006.01) |
| *F23Q 3/01* | (2006.01) |
| *F24F 6/12* | (2006.01) |
| *H01M 10/48* | (2006.01) |
| *H01M 50/247* | (2021.01) |
| *H02J 7/00* | (2026.01) |
| *H02J 7/80* | (2026.01) |
| *F24F 6/00* | (2006.01) |

(52) U.S. Cl.
CPC ......... *H01M 50/296* (2021.01); *A61H 7/005* (2013.01); *F21L 4/08* (2013.01); *F23Q 3/01* (2013.01); *F24F 6/12* (2013.01); *H01M 10/488* (2013.01); *H01M 50/247* (2021.01); *H02J 7/80* (2026.01); *H02J 7/865* (2026.01); *A61H 2201/0107* (2013.01); *A61H 2201/0207* (2013.01); *F24F 2006/008* (2013.01); *H01M 2220/30* (2013.01)

(58) Field of Classification Search
CPC ............. H01M 50/296; H01M 10/488; H01M 50/247; H01M 2220/30; A61H 7/005;

A61H 2201/0107; A61H 2201/0207; F21L 4/08; F23Q 3/01; F24F 6/12; F24F 2006/008; H02J 7/0047; H02J 7/0068
See application file for complete search history.

(56) References Cited

U.S. PATENT DOCUMENTS

| | | | |
|---|---|---|---|
| 9,312,706 | B2 | 4/2016 | Workman et al. |
| 12,074,336 | B2 | 8/2024 | Li |
| 12,317,924 | B1 * | 6/2025 | Ning ........................ A24F 40/30 |
| 2005/0175331 | A1 * | 8/2005 | Tam ........................ A61L 9/037 |
| | | | 392/405 |
| 2010/0156184 | A1 | 6/2010 | Ludtke |
| 2016/0028260 | A1 * | 1/2016 | Workman ............ H01R 31/065 |
| | | | 439/628 |
| 2024/0063447 | A1 | 2/2024 | Hong |

* cited by examiner

*Primary Examiner* — Basia A Ridley
*Assistant Examiner* — Heng M. Chan
(74) *Attorney, Agent, or Firm* — JEEN IP LAW, LLC

(57) ABSTRACT

A handheld mobile device includes a power module. The power module includes a battery compartment housing. The battery compartment housing has the shape of a square prism. An electric module includes a housing. At least a portion of the housing has the shape of a prismatic cylinder. The power module and the electric module are configured to be magnetically assembled by means of the second set of magnetic blocks and the first set of magnetic blocks. The electrode contacts are configured to be in contact with the electrode interfaces to allow the power module and the electric module to form a closed circuit.

18 Claims, 23 Drawing Sheets

2a(2)

1

7

224(22)

2c(2)

21

1

225(22)

2d(2)

21

1

A

2e(2)

A

227 A-A

226

27

2g(2)

1

B-B

HANDHELD MOBILE DEVICE

TECHNICAL FIELD

The present disclosure relates to the technical field of power supply devices, and in particular, to a handheld mobile device.

BACKGROUND

With the wide application of portable electronic devices, the demand for power modules is increasing. A traditional connecting manner for a power module and an electronic device usually relies on physical plug-in interfaces, which are prone to poor contact due to wear and tear or looseness, affecting the normal operation of the electronic device. Plug-in interfaces exposed to dust, moisture and other environmental influences may reduce the service life of the electronic device. Traditional interfaces need to be precisely aligned, making them more difficult for use, especially in confined spaces or complex environments. The lack of flexible and versatile combinations between existing power modules and electronic devices limits the application scenarios of them.

SUMMARY

A first aspect of the present disclosure provides a handheld mobile device, including a power module and an electric module. The electric module includes a housing. The power module includes: a battery compartment housing; a battery provided inside the battery compartment housing; a plurality of electrode interfaces exposed at an end of the battery compartment housing, the plurality of electrode interfaces being electrically connected to the battery; and a first set of magnetic blocks disposed at the end of the battery compartment housing.

BRIEF DESCRIPTION OF THE DRAWINGS

The drawings that form part of the present disclosure are provided to further illustrate the present disclosure. The illustrative embodiments and their descriptions of the present disclosure are intended to explain but do not constitute an undue limitation on the present disclosure.

DETAILED WAY

Figure 1:
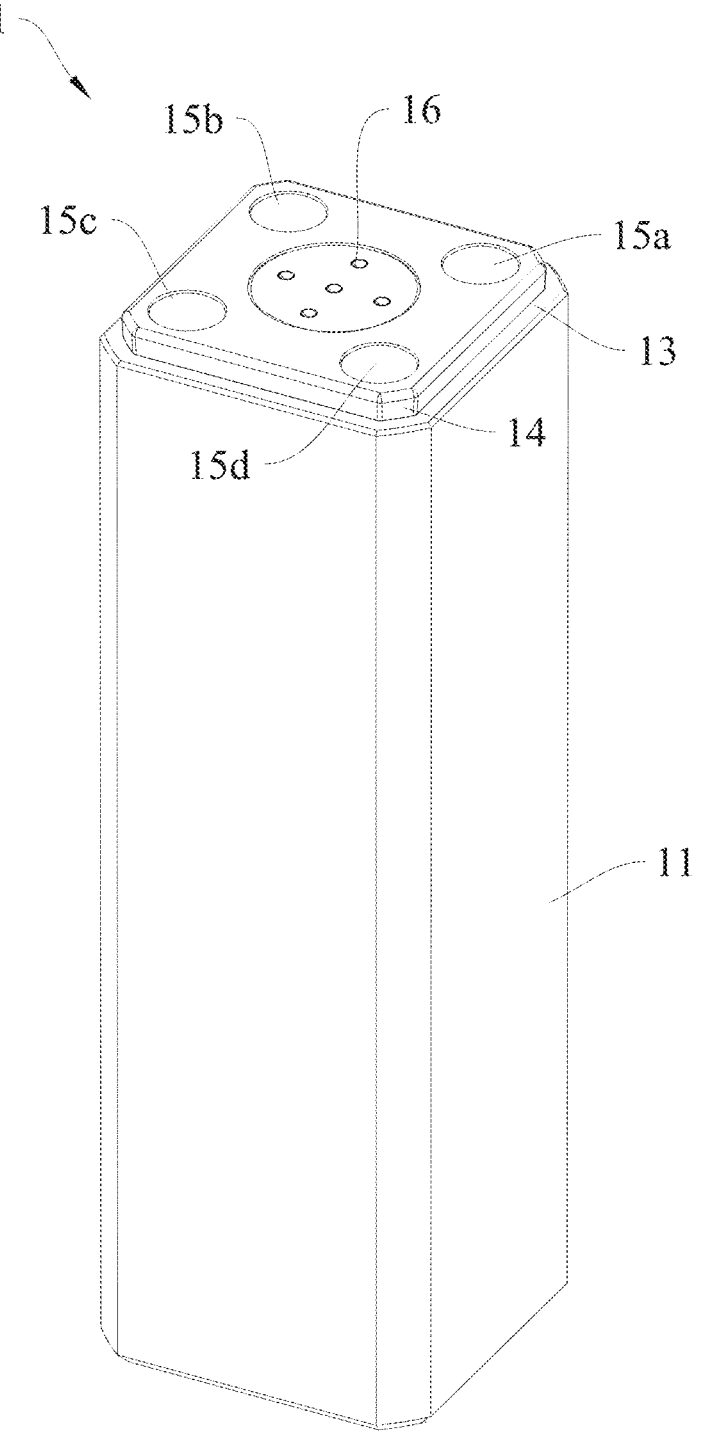
FIG. 1 is a perspective view of a power module according to some embodiments of the present disclosure.
Figure 2:
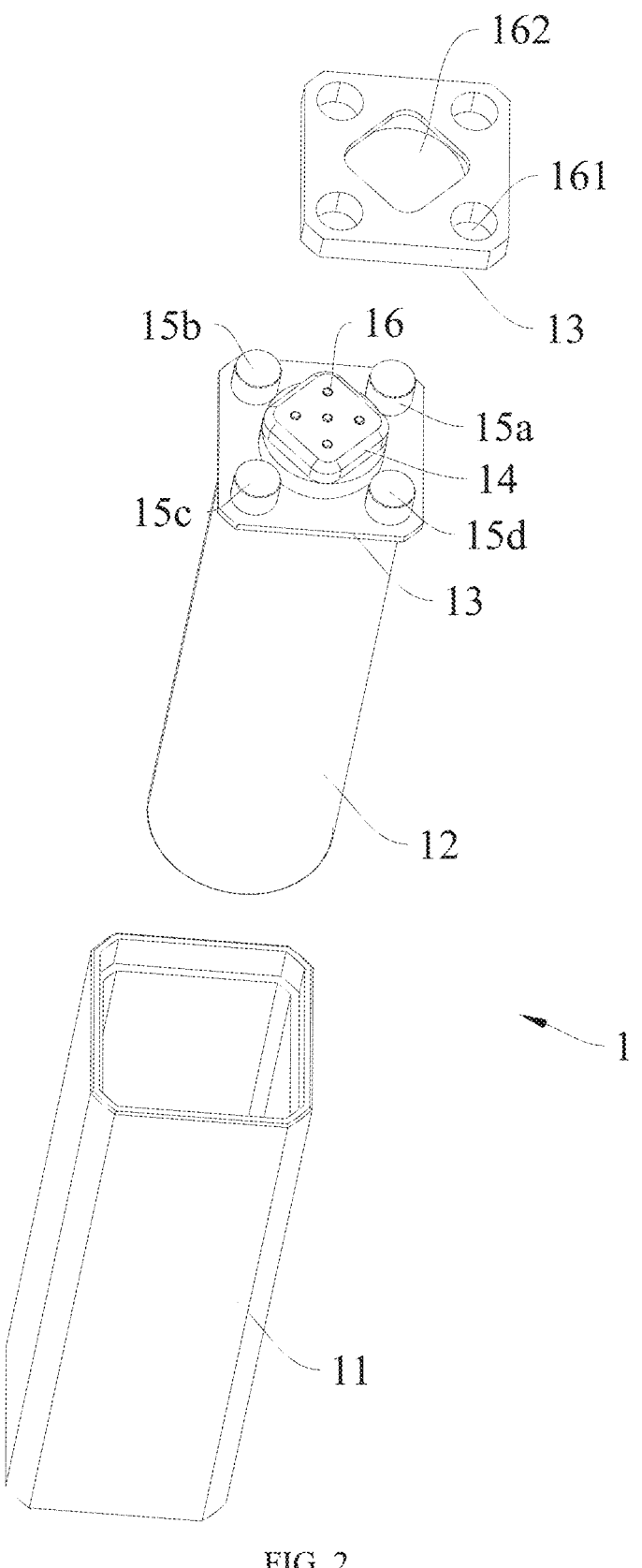
FIG. 2 is an exploded, perspective view of a power module according to some embodiments of the present disclosure.
Figure 3:
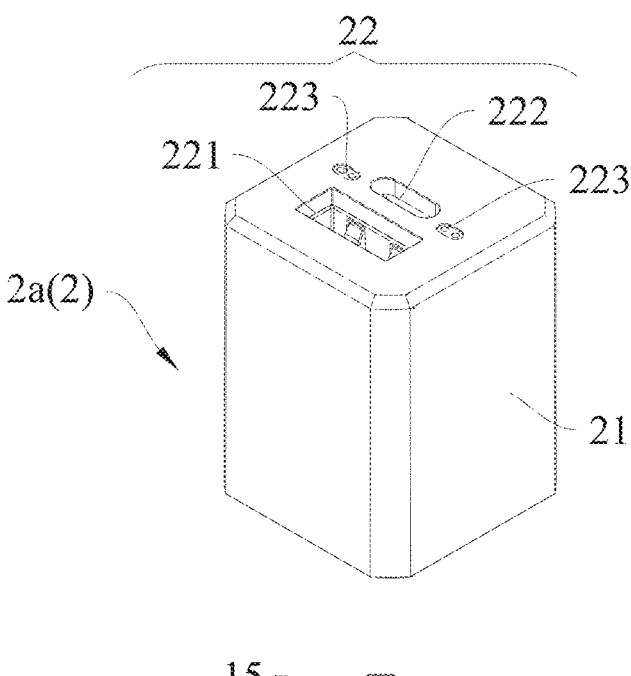
FIG. 3 is a perspective view of a power module and a first power transmission module according to Embodiment 1 of the present disclosure.
Figure 3:
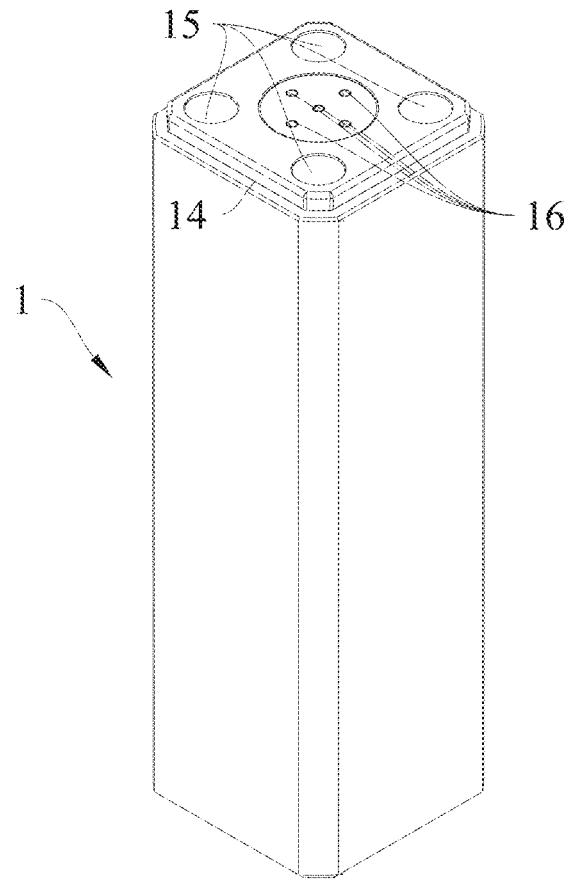
Figure 4:
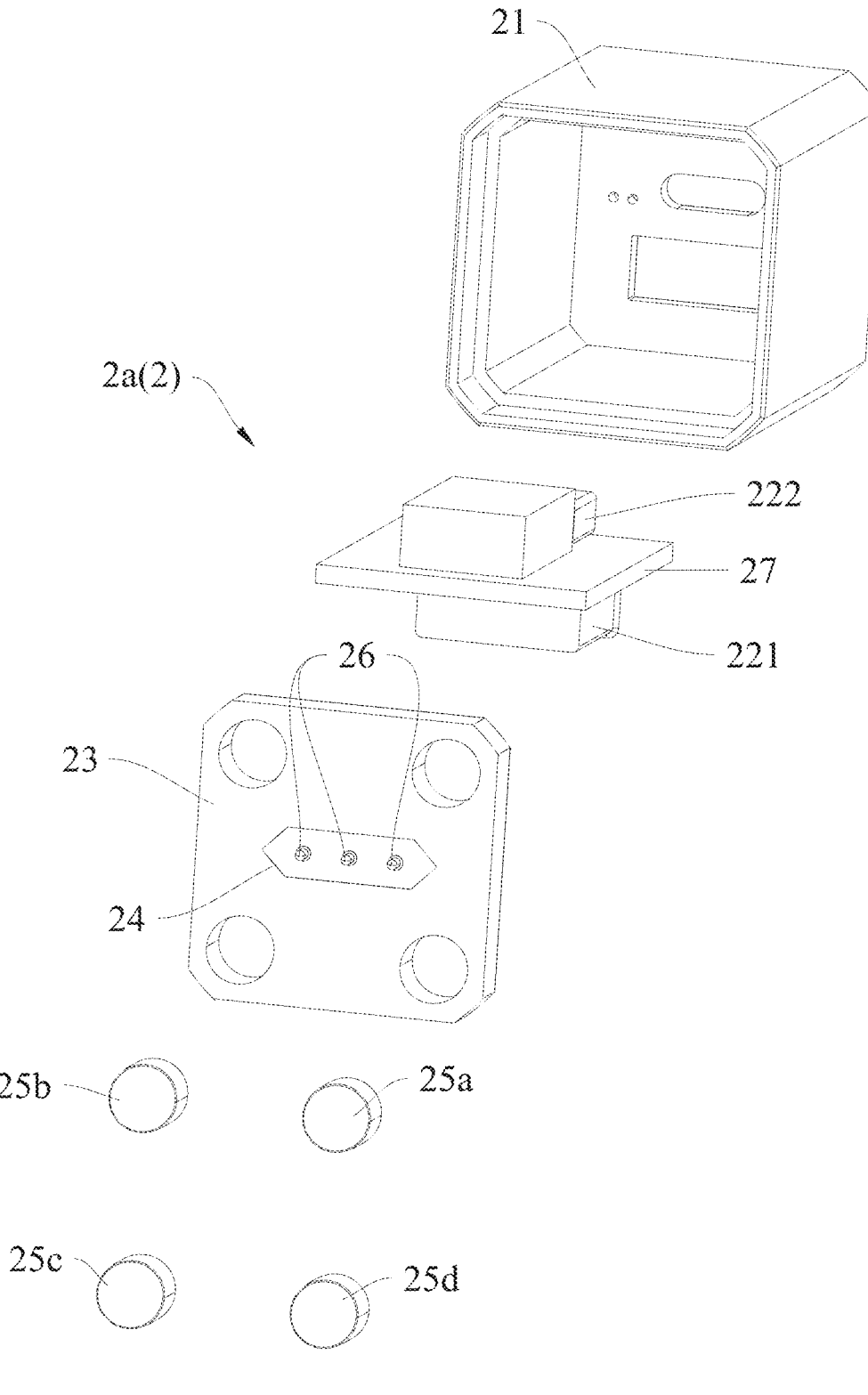
FIG. 4 is an exploded view of a first power transmission module according to Embodiment 1 of the present disclosure.

The present disclosure is described in detail below with reference to the accompanying drawings and in conjunction with various embodiments. Each example is provided to explain but not to constitute undue limitation on the present disclosure. In fact, it is clear to those of ordinary skill that modifications and variations may be made without departing from the scope or spirit of the present disclosure. For example, a feature shown or described as a part of one embodiment may be used by another embodiment to produce yet another embodiment. Therefore, it is intended that the present disclosure includes such modifications and variations within the scope of the appended claims and their equivalents.

In the description of the present disclosure, the terms "longitudinal", "lateral", "upper", "lower", "front", "back", "left", "right", "vertical", "horizontal", "top", "bottom" and the like indicate the orientational or positional relationships based on the orientational or positional relationships illustrated in the drawings, which are only for the convenience of describing and do not require the present disclosure to be constructed and operated in a specific orientation, and therefore shall not be understood as limitation on the present disclosure. The terms "connected", "connecting" and "arranged" used in the present disclosure should be understood in a broad sense. For example, it may be a fixed connection or a detachable connection; it may be directly connected or indirectly connected through an intermediate component; it may also be a wired electrical connection, a radio connection, or a wireless signal connection. For those of ordinary skill in the art, the specific meanings of the above terms may be understood according to the specific circumstances.

One or more examples of the present disclosure are illustrated in the attached drawings. Characters and letters are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of each component.

The present disclosure disclosed a handheld mobile device, which realizes stable and reliable electrical connection between two modules through magnetic connection and mechanical securing structure. The handheld mobile device has good waterproof and dustproof performance and is convenient for assembly, which enhances its expandability and adaptability.

The present disclosure provides a handheld mobile device, as shown in FIGS. 1-23, including a power module 1 and an electric module 2. The power module 1 includes a battery compartment housing 11 having a shape of a square prism and a battery 12 disposed in an interior of the battery compartment housing 11. The square-prism shaped battery compartment housing 11 includes four side surfaces, a top surface, and a bottom surface. A first mounting platform 13 disposed at a top of the battery compartment housing 11. Based on the actual needs, the first mounting platform 13 can be set on the top surface or the bottom surface, or even both the top surface and the bottom surface, which facilitates modulation and expansion with other modules and improves the versatility of the system.

Embodiment 1

According to an embodiment of the present disclosure, as shown in FIGS. 1-6, the power module 1 is provided with a first mounting platform 13 at a top of the battery compartment housing 11, which is convenient for modulation and expansion, optimizes the space utilization, and enhances the stability and convenience of assembly. The first mounting platform 13 is provided with a limit bump 14, the limit bump 14 is protruded on an outer surface of the first mounting platform 13. The limit bump 14 is sheathed to the electrode interface 16 through an electrode interface mounting slot 162 to allow an outer surface of the limit bump 14 to surround outside the electrode interface 16. In the present embodiment, the first mounting platform 13 is provided with five electrode interfaces, which are a first electrode interface 16a, a second electrode interface 16b, a third electrode interface 16d, a fourth electrode interface 16e, and a fifth electrode interface 16c. The first electrode interface 16a, the second electrode interface 16b, the third electrode interface 16d, the fourth electrode interface 16e, and the fifth electrode interface 16c are connected in parallel with the battery 12. A first set of magnetic blocks 15 around the limit bump 14 is installed in the magnetic block mounting slots 161 defined by the first mounting platform 13. A first magnetic block 15a, a second magnetic block 15b, a third magnetic block 15c, and a fourth magnetic block 15d are disposed symmetrically and equidistantly with respect to a center point on the limit bump 14. The limit bump 14 provides a mechanical positioning function to ensure that an electric module 2 can be accurately aligned when assembled with the power module 1. This structure makes the connection between the power module 1 and the electric module 2 more stable and reliable, and reduces the problem of poor contact caused by positional deviation. The outwardly convex limit bump 14 increases the contact area and friction, which help to physically secure the electric module 2 and prevent it from loosening or falling off during use.

The first set of magnetic blocks 15 is set symmetrically with respect to the center point of the limit bumps 14, which ensures precise alignment of the power module 1 and the electric module 2 when they are assembled. This symmetrical design helps reduce assembly errors and ensures accurate contact between the electrode interfaces and the electrode contacts. Due to the symmetrical distribution of the magnetic blocks, a user can rotate the first set of magnetic blocks 15 by 90° either clockwise or counterclockwise for assembly, ensuring that the magnetic blocks are correctly aligned, and simplifying the operations and improves the user experience. Four magnetic blocks work simultaneously, even if one magnetic block on one side is affected by external forces, the other magnetic blocks can still maintain a stable connection, which enhances the overall structure of the anti-interference ability. This is especially important for handheld devices, as a user may operate the device at different angles and positions. When separation of the two modules is required, the user only needs to apply a certain amount of external force to easily disengage the magnetic connection, reducing the difficulty to disassemble the two modules attracted to each other by strong magnetic force.

As shown in FIGS. 3-6, according to an embodiment of the present disclosure, electric module 2 is provided. The electric module 2 includes a first power transmission module 2a. The first power transmission module 2a includes a housing 21 and an electric member 22 mounted in an interior of the housing 21. The electric member 22 includes a USB interface assembly 221 and a Type-C interface assembly 222, both electrically connected to a printed circuit board (PCB) 27 and configured to charge and power an external device for the user. The electric member 22 includes a display light 223 configured to display a status of the electrical pathway for the user. The display light 223. The USB interface assembly 221, and the Type-C interface assembly 222 are all integrated and electrically connected to the printed circuit board 27. The housing 21 is a square prism having a top surface and a bottom surface. An edge length of the top surface of the housing 21 is equal to an edge length of the square top surface of the square-primed battery compartment housing 11, ensuing dimensional match and precise alignment between the two modules. This design makes the assembly between the modules more stable and reliable.

One end of the housing 21 is provided with a second mounting platform 23. The second mounting platform 23 is defined with a limit slot 24, the limit slot 24 is defined by an outer surface of the second mounting platform 23 and an inner surface of the housing 21. The limit bump 14 has a square cross-section, and the limit slot 24 is square so as to be engaged with the limit bump 14. The limit slot 24 is adapted to the limit bump 14 on the power module 1, providing a mechanical positioning function that ensures that the two modules can be quickly and accurately assembled to each other and remain stable after assembly. This structure reduces the problem of poor contact due to positional deviations.

An outer surface of the limit slot 24 is provided with a plurality of electrode contacts 26 exposed outside the limit slot 24, and the electrode contacts 26 are electrically connected to the electric member 22. The electrode contacts 26 are electrically connected to the electric member 22 and tightly contact with the electrode interfaces 16 on the power module during assembly, ensuring efficient power transmission and reliable electrical connection. This design reduces the contact resistance and improves the reliability of the electrical connection.

The outer surface of the second mounting platform 23 is also provided with a second set of magnetic blocks 25. The second set of magnetic blocks 25 includes four magnetic blocks, respectively a fifth magnetic block 25a, a sixth magnetic block 25b, a seventh magnetic block 25c and an eighth magnetic block 25d. The quantity and position of the second set of magnetic blocks 25 correspond one-to-one to the quantity and position of the first set of magnetic blocks 15, which includes the first magnetic block 15a, the second magnetic block 15b, the third magnetic block 15c and the fourth magnetic block 15d. A connecting line of the first magnetic block 15a and the third magnetic block 15c is perpendicular to a connecting line of the second magnetic block 15b and the fourth magnetic block 15d, to ensure that during each 90° of rotation, the second set of magnetic blocks 25 can be magnetically connected with the first set of magnetic blocks 15 in a one-to-one correspondence. The magnetic attraction allows the power module 1 and the electric module 2 to be engaged with together quickly and securely. The magnetic connection is not only convenient, secure, and fast, but also compensates for slight positional deviations.

The power module 1 and the electric module 2 can be magnetically connected by the first set of magnetic blocks 15 and the second set of magnetic blocks 25. The electrode contacts 26 contact their corresponding electrode interfaces 16, allowing the power module 1 and the electric module 2 to form a closed circuit. The first power transmission module 2a is proximal to the power module 1 to facilitate automatic connection between them; when disassembled, the first power transmission module 2a and the power module 1 can also be separated by a gently pulling, greatly simplifying the assembly and disassembly process and enhancing the user experience. The first set of magnetic blocks 15 generates a magnetic attraction that facilitates a rapid and secure connection between the power module and the electric module. The magnetic connection is not only convenient and fast, but also compensates for slight positional deviations.

Figure 5:
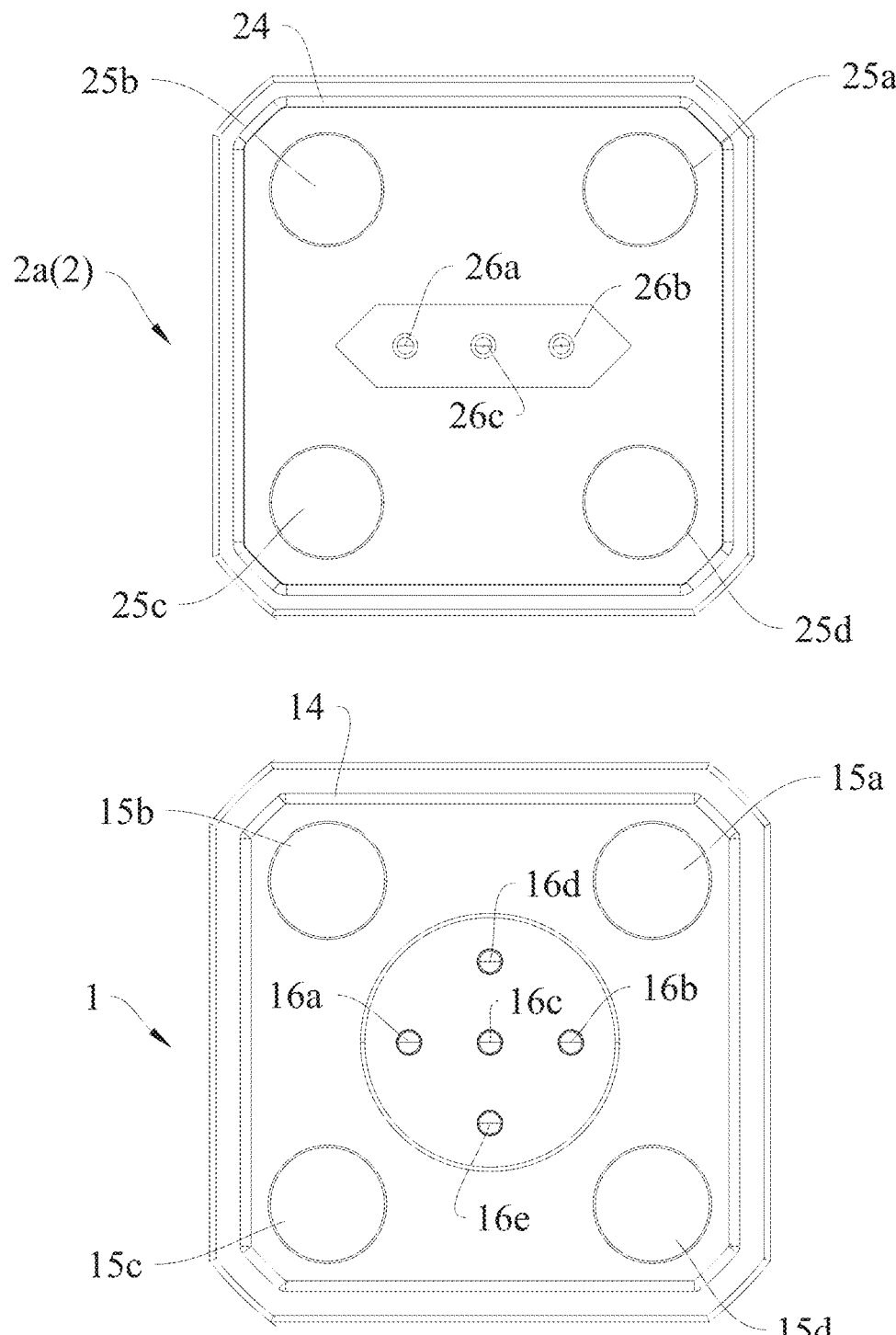
FIG. 5 is a perspective view of a first mounting platform of a power module and a second mounting platform of a first power transmission module according to Embodiment 1 of the present disclosure.
Figure 6:
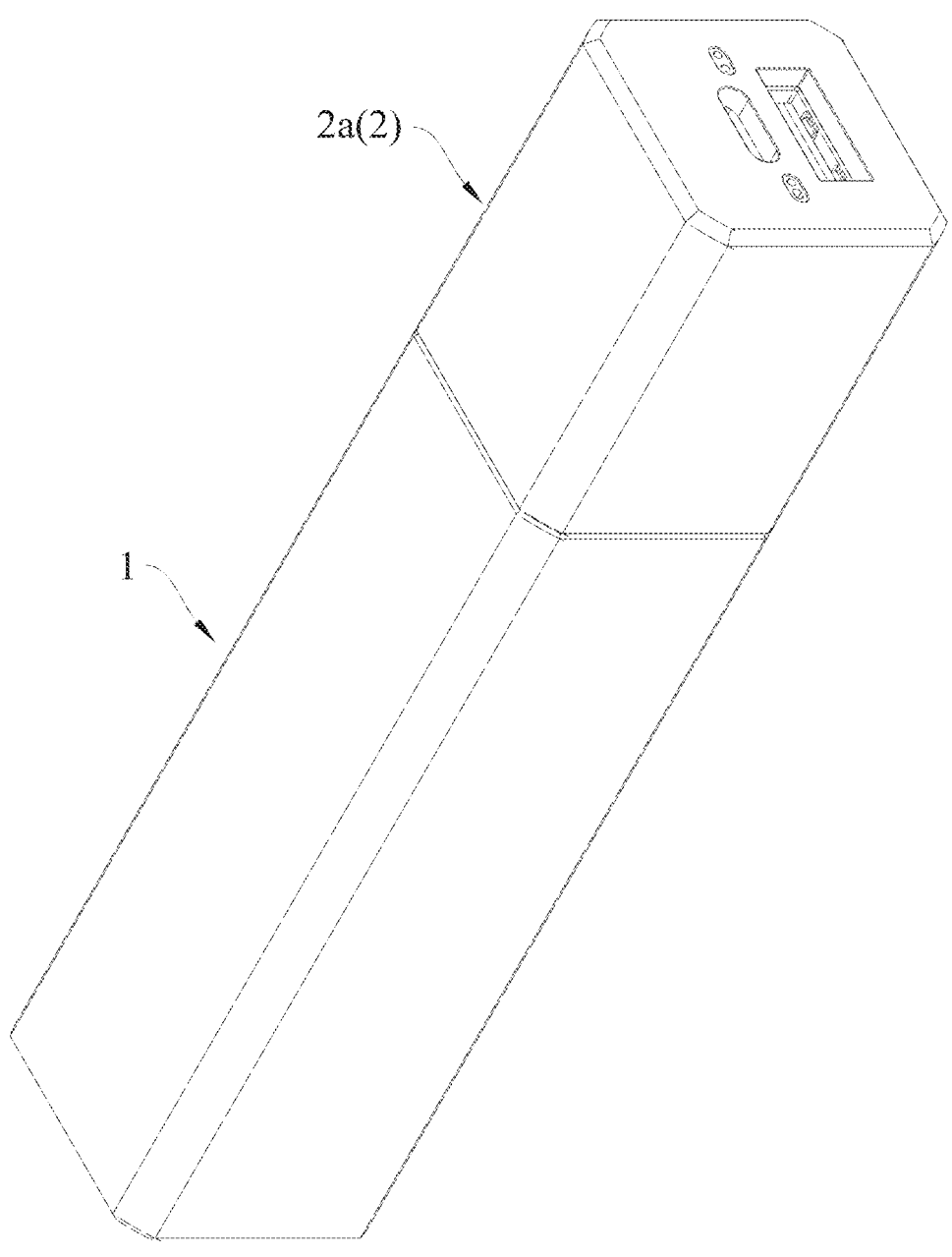
FIG. 6 is a perspective view of a power module and a first power transmission module being assembled according to Embodiment 1 of the present disclosure.

As shown in FIG. 5, five electrode interfaces 16 are provided, respectively a first electrode interface 16a, a second electrode interface 16b, a third electrode interface 16d, a fourth electrode interface 16e, and a fifth electrode interface 16c. The first electrode interface 16a, the second electrode interface 16b, the third electrode interface 16d, the fourth electrode interface 16e are center-symmetrically distributed around the fifth electrode interface 16c, forming a square symmetrical structure. A quantity of the electrode contacts 26 is three, respectively a first electrode contact 26a, a second electrode contact 26c and a third electrode contact 26b. The first electrode contact 26a, the second electrode contact 26c and the third electrode contact 26b are arranged in a straight line. The first electrode contact 26a, the second electrode contact 26c and the third electrode contact 26b can be coupled to the electric module 2 by the following contacting modes. The first type is that the first electrode contact 26a, the second electrode contact 26c and the third electrode contact 26b are in contact with the first electrode interface 16a, the fifth electrode interface 16c, and the second electrode interface 16b, respectively. The second type is that the first electrode contact 26a, the second electrode contact 26c and the third electrode contact 26b are in contact with the third electrode interface 16d, the fifth electrode interface 16c, and the fourth electrode interface 16e, respectively. The third type is that the first electrode contact 26a, the second electrode contact 26c and the third electrode contact 26b are contacted with the second electrode interface 16b, the fifth electrode interface 16c, and the first electrode interface 16a, respectively. The fourth type is that the first electrode contact 26a, the second electrode contact 26c and the third electrode contact 26b are contacted with the fourth electrode interface 16e, the fifth electrode interface 16c, the third electrode interface 16d, respectively. The square symmetrical structure of the electrode interfaces 16 and the flexible arrangement of the electrode contacts 26 ensures that the electrode contacts 26 are correctly contacted with the electrode interfaces 16 to form a closed circuit regardless of whether the power module 1 is rotated 90° clockwise or counterclockwise during magnetic coupling. This design significantly improves the flexibility and reliability of the coupling between the two modules. Four different contact types ensure that the contacts between the electrode contacts 26 and the electrode interfaces 16 remains reliable even under different coupling orientations, and reduces the problem of poor contact due to positional deviation. This design improves the stability and reliability of the electrical connection, and the user does not need to worry about the precise alignment between the power module 1 and the electric module 2. The two modules only need to be proximal to each other, and the secure electrical connection can be automatically completed through magnetic attraction. The tight contact between the electrode contacts 26 and the electrode interfaces 16 reduces contact resistance, ensures efficient power transmission, and improves reliability of the electrical connection. As the electrode interfaces 16 are protected by the limit bumps 14, the influence of the external environment (e.g. dust, water vapor) on the electrode interfaces 16 is reduced, extending the service life of the device.

Embodiment 2

Figure 7:
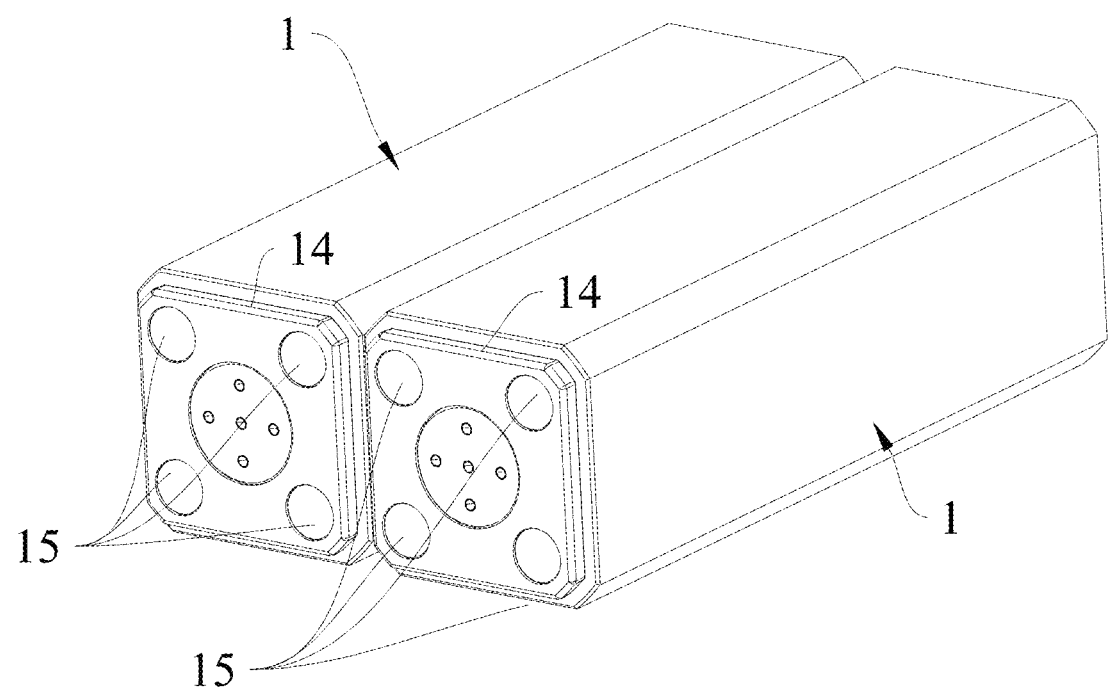
FIG. 7 is a perspective view of a power module and a second power transmission module according to Embodiment 2 of the present disclosure.
Figure 7:
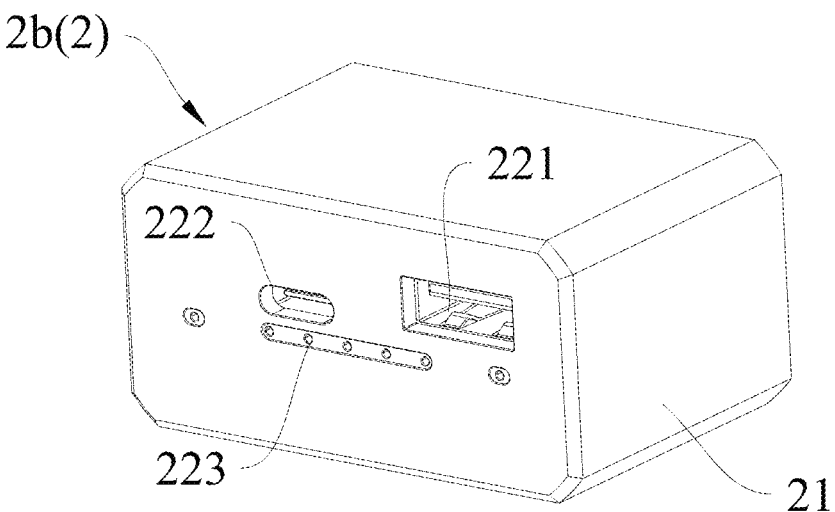
Figure 8:
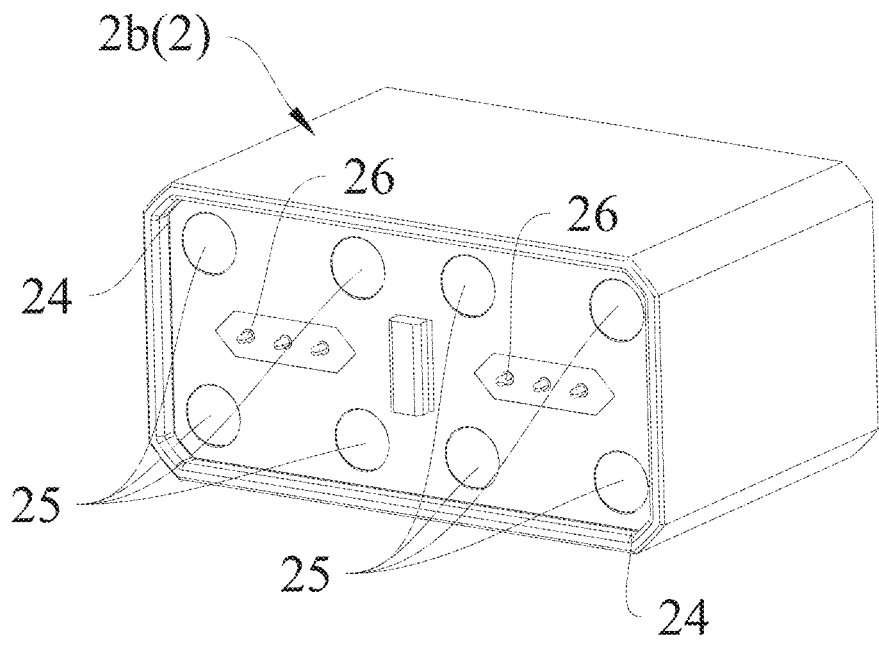
FIG. 8 is another perspective view of a power module and a second power transmission module according to in Embodiment 2 of the present disclosure.
Figure 8:
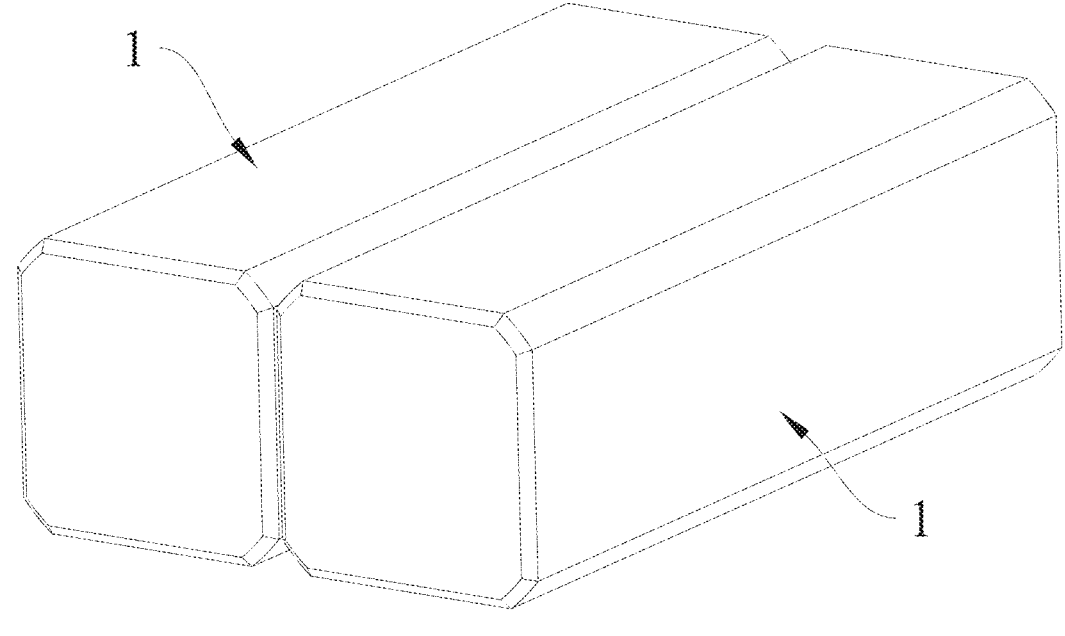
Figure 9:
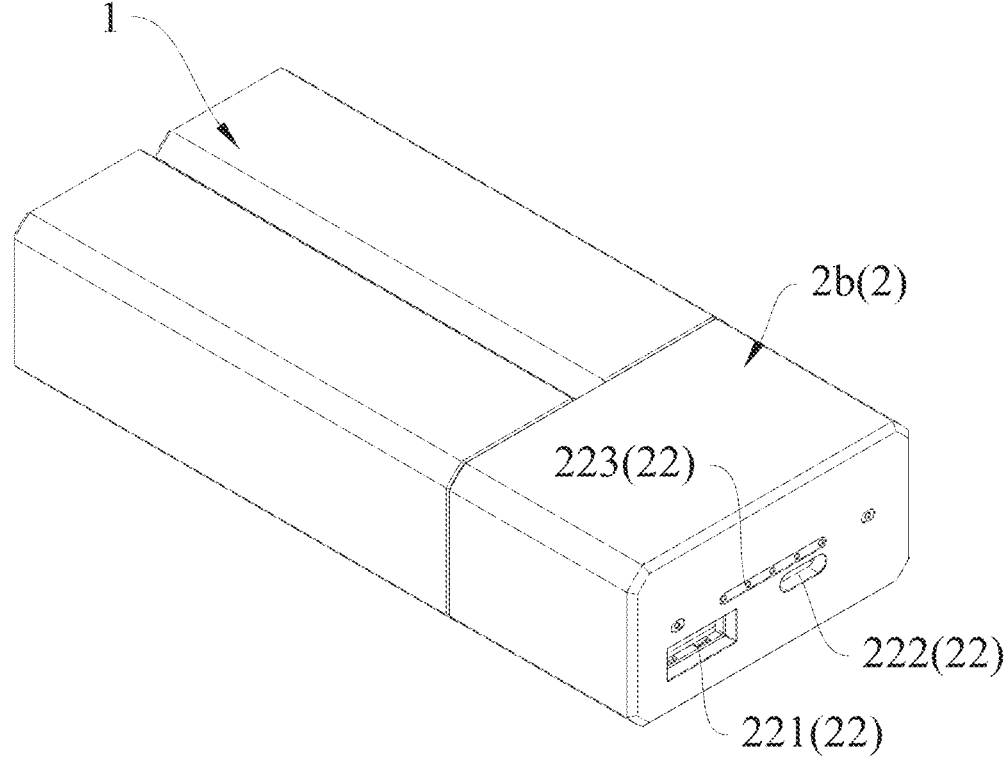
FIG. 9 is a perspective view of a power module and a second power transmission module being assembled according to Embodiment 2 of the present disclosure.

As shown in FIG. 7-FIG. 9, according to an embodiment of the present disclosure, the electric module 2 includes second power transmission module 2b. The second power transmission module 2b includes a housing 21 and an electric member 22 mounted inside the housing 21. The electric member 22 includes a USB interface assembly 221, a Type-C interface assembly 222, and a display light 223 electrically connected to a printed circuit board 27, respectively. The housing 21 has a shape of a quadrangular prism. Left and right edge lengths of a side surface of the quadrangular-prismed housing are equal to the edge lengths of a top side surface of the square-prismed battery compartment housing 11. Top and bottom edge lengths of the side surface of the quadrangular-prismed housing are two times the ed widths of the top side surface of the square-prismed battery compartment housing 11. An end of the battery compartment housing 11 is provided with two sets of first mounting platforms 13 and two sets of limit bumps 14. The two first sets of magnetic blocks 15 and the two sets of electrode interfaces 16 are provided so that the electric module 2 is adapted to the two power modules 1. The two sets of first mounting platforms 13 are coplanar and in one piece. Each component on each power module 1 is the same as that of Embodiment 1, and all other components of the electric module 2 are the same as the components of the electric module 2 of Embodiment 1.

Embodiment 3

Figure 10:
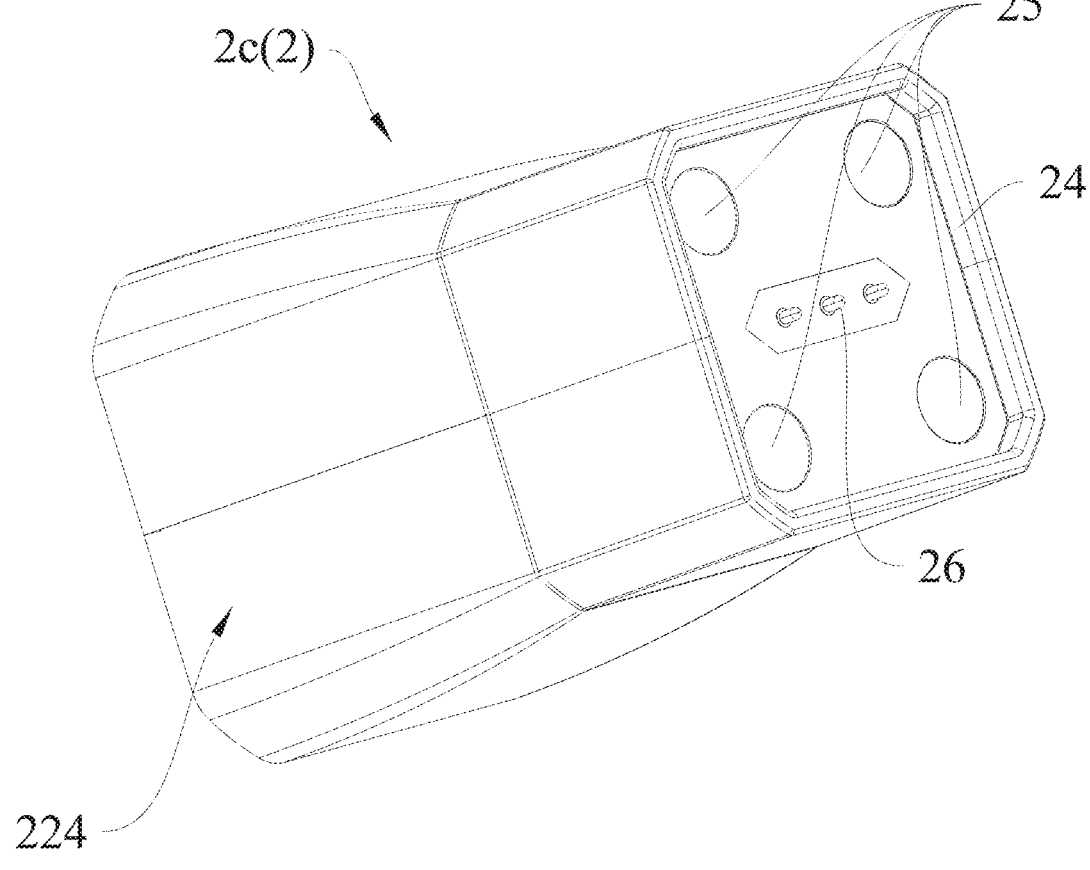
FIG. 10 is a perspective view of a flashlight module according to Embodiment 3 of the present disclosure.
Figure 11:
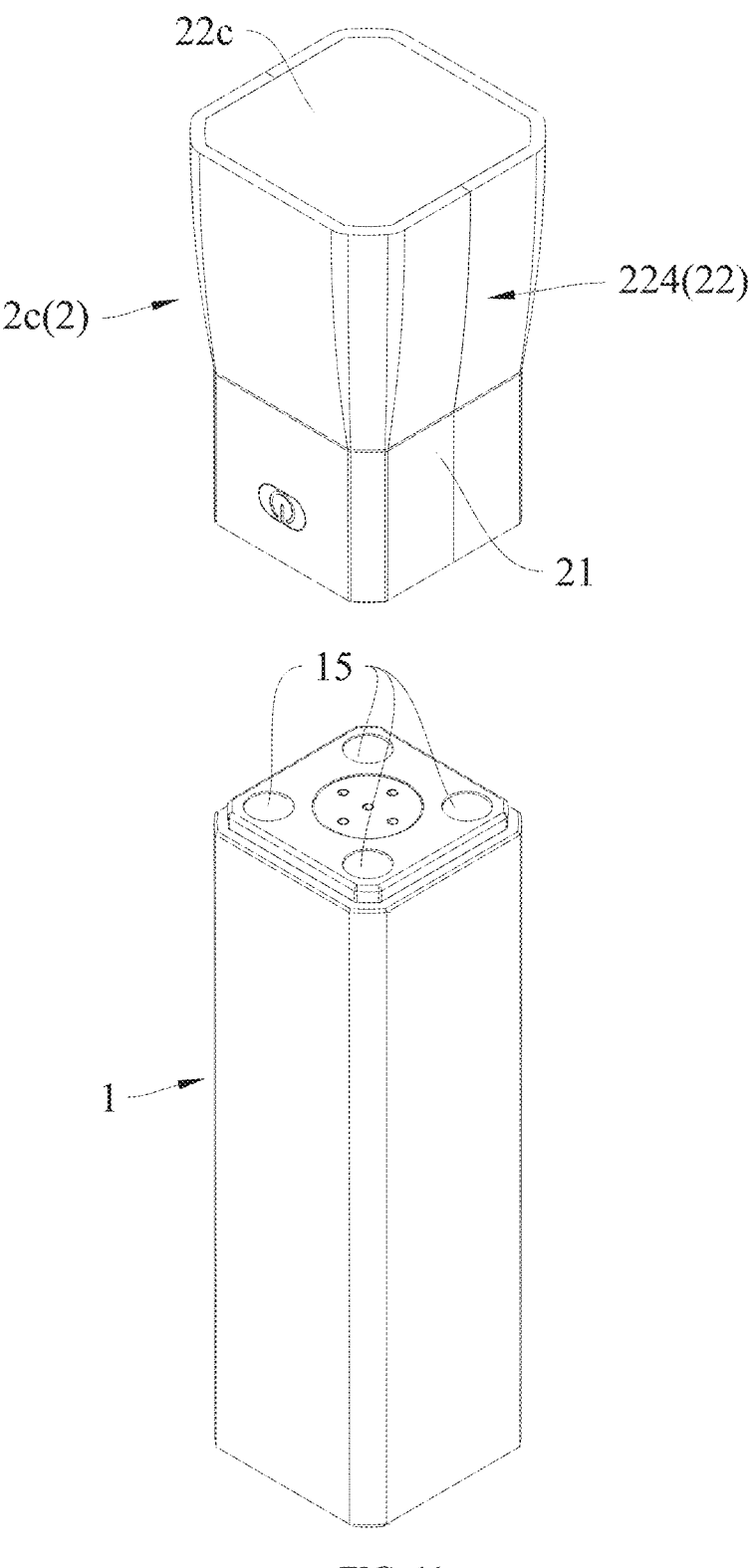
FIG. 11 is a perspective view of a flashlight module and a power module being disassembled according to Embodiment 3 of the present disclosure.
Figure 12:
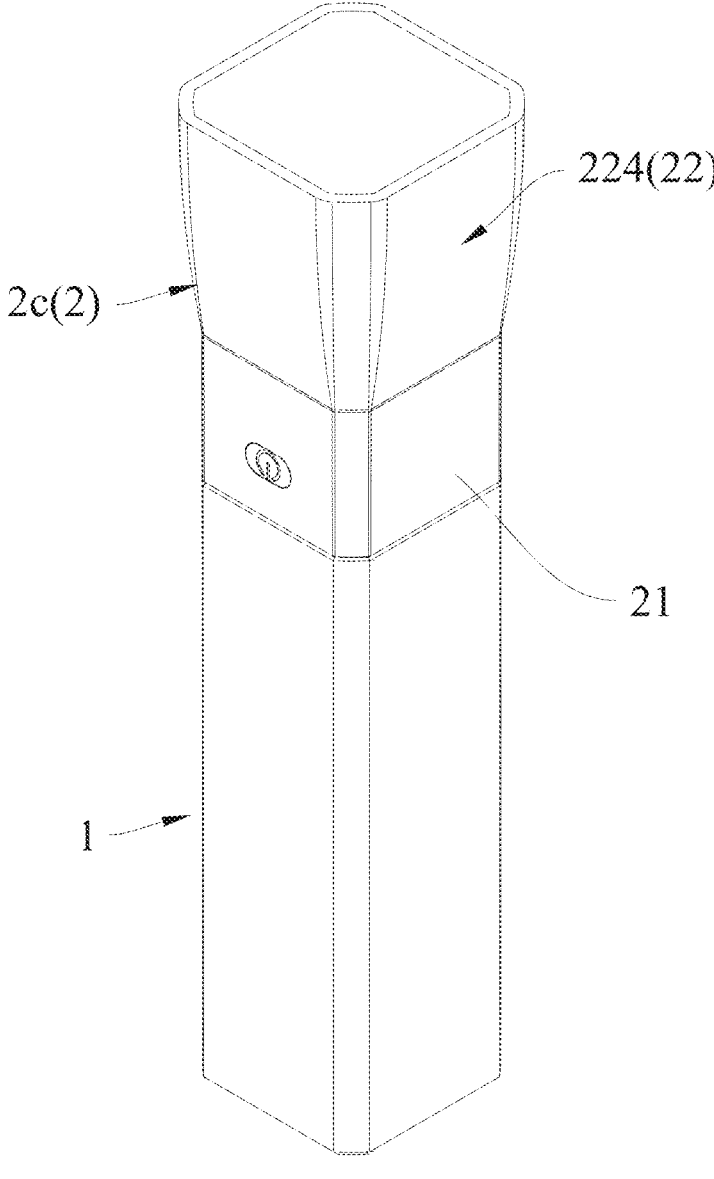
FIG. 12 is a perspective view of a flashlight module and a power module after being magnetically assembled according to Embodiment 3 of the present disclosure.

As shown in FIG. 10-FIG. 12, in some embodiments, the electric module 2 includes a flashlight module 2*c*. The flashlight module 2*c* includes a light bulb assembly 224. A portion of a housing 21 of the flashlight module 2*c* is square-prismed, thereby adapting to fit into a housing of the power module 1. The flashlight module 2*c* includes a light bulb 22*c* and a second mounting platform 23 adapted to the power module 1, a limit slot 24, ae second set of magnetic blocks 25, electrode contacts 26 and a printed circuit board 27. The structure of the components on the second mounting platform 23 is the same as that of Embodiment 1.

Embodiment 4

Figure 13:
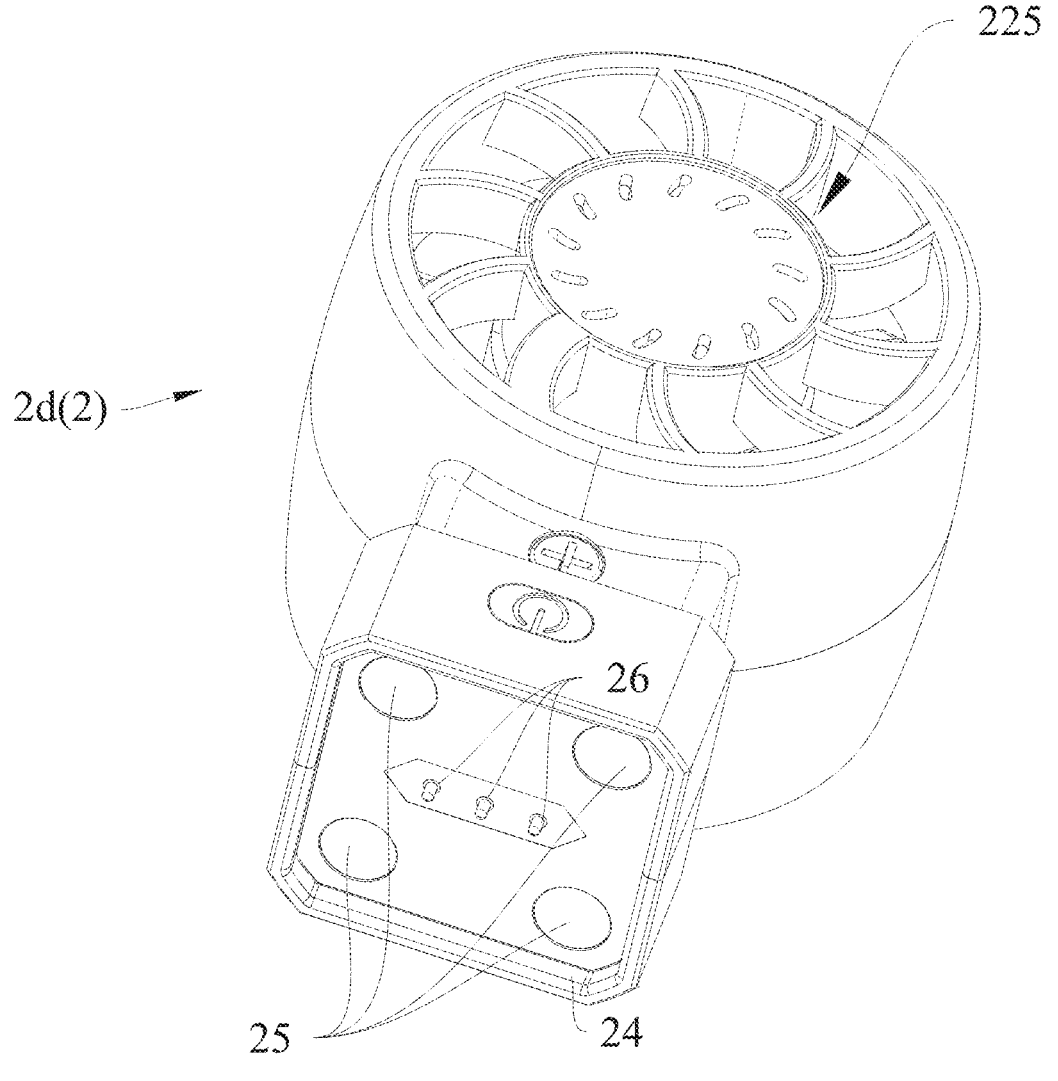
FIG. 13 is a perspective view of a fan module according to Embodiment 4 of the present disclosure.
Figure 14:
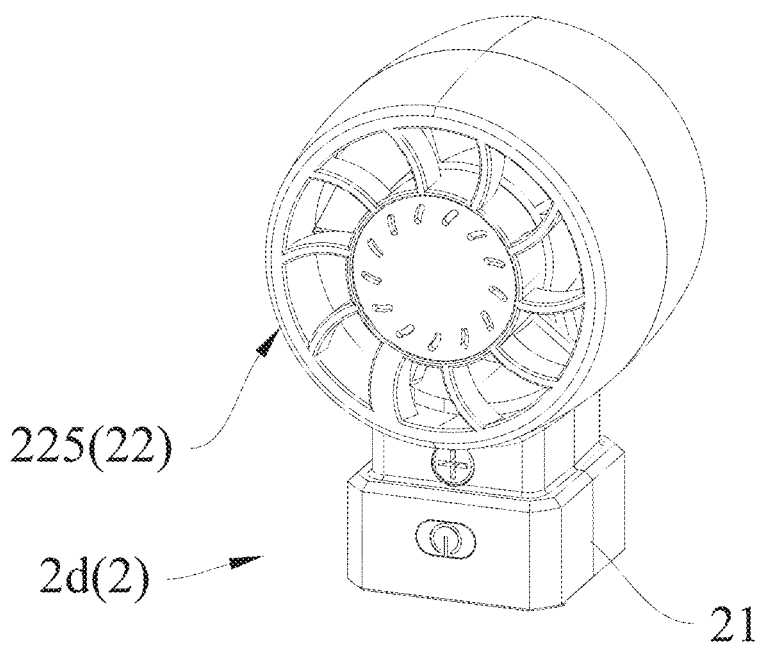
FIG. 14 is a perspective view of a fan module and a power module being assembled according to Embodiment 4 of the present disclosure.
Figure 14:
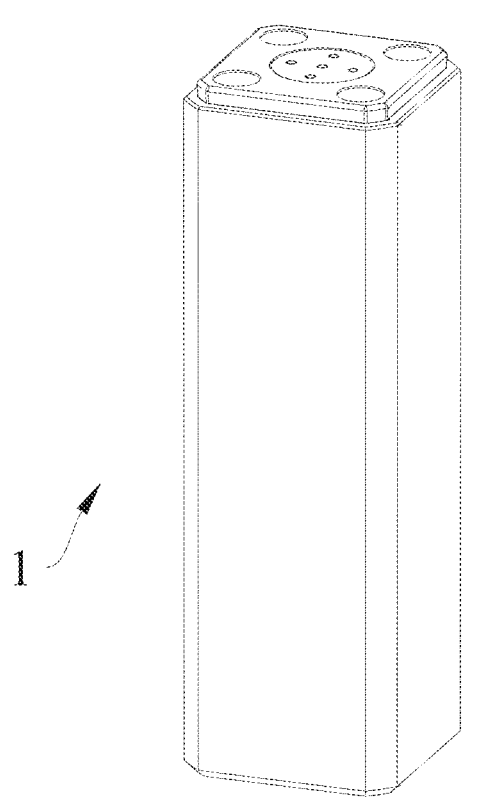
Figure 15:
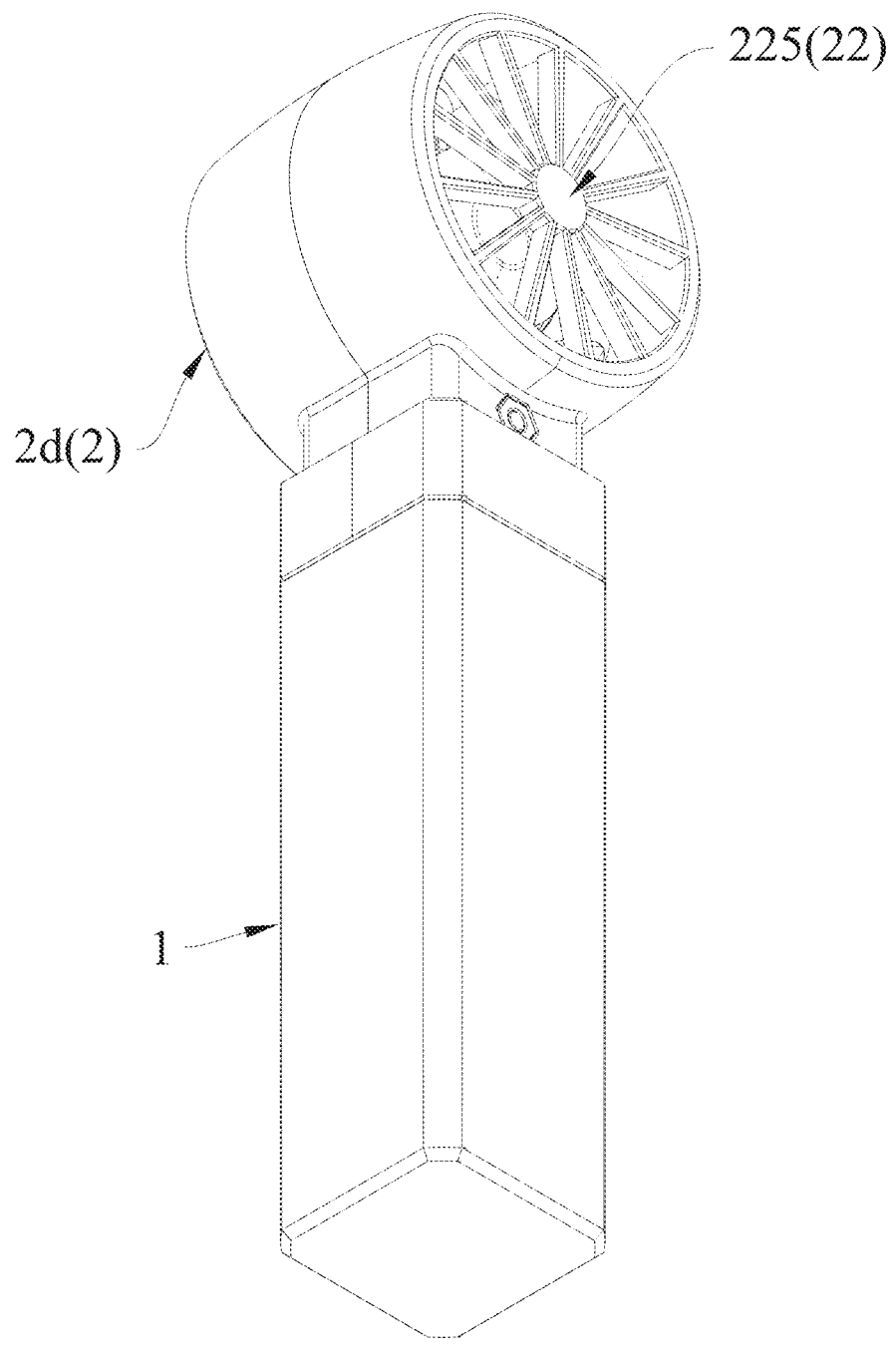
FIG. 15 is a perspective view of a fan module and a power module after being magnetically assembled according to Embodiment 4 of the present disclosure.

As shown in FIG. 13-FIG. 15, the electric modules 2 includes a fan module 2*d*. The fan module 2*d* includes a fan assembly 225. A portion of a housing 21 of the fan module 2*d* is square-prismed for adapting to the housing of the power module 1. The fan module 2*d* includes a fan and a second mounting platform 23 adapted to the power module 1, a limit slot 24, a second set of magnetic blocks 25, electrode contacts 26 and a printed circuit board 27. The structure of the components on the second mounting platform 23 is the same as that of Embodiment 1.

Embodiment 5

Figure 16:
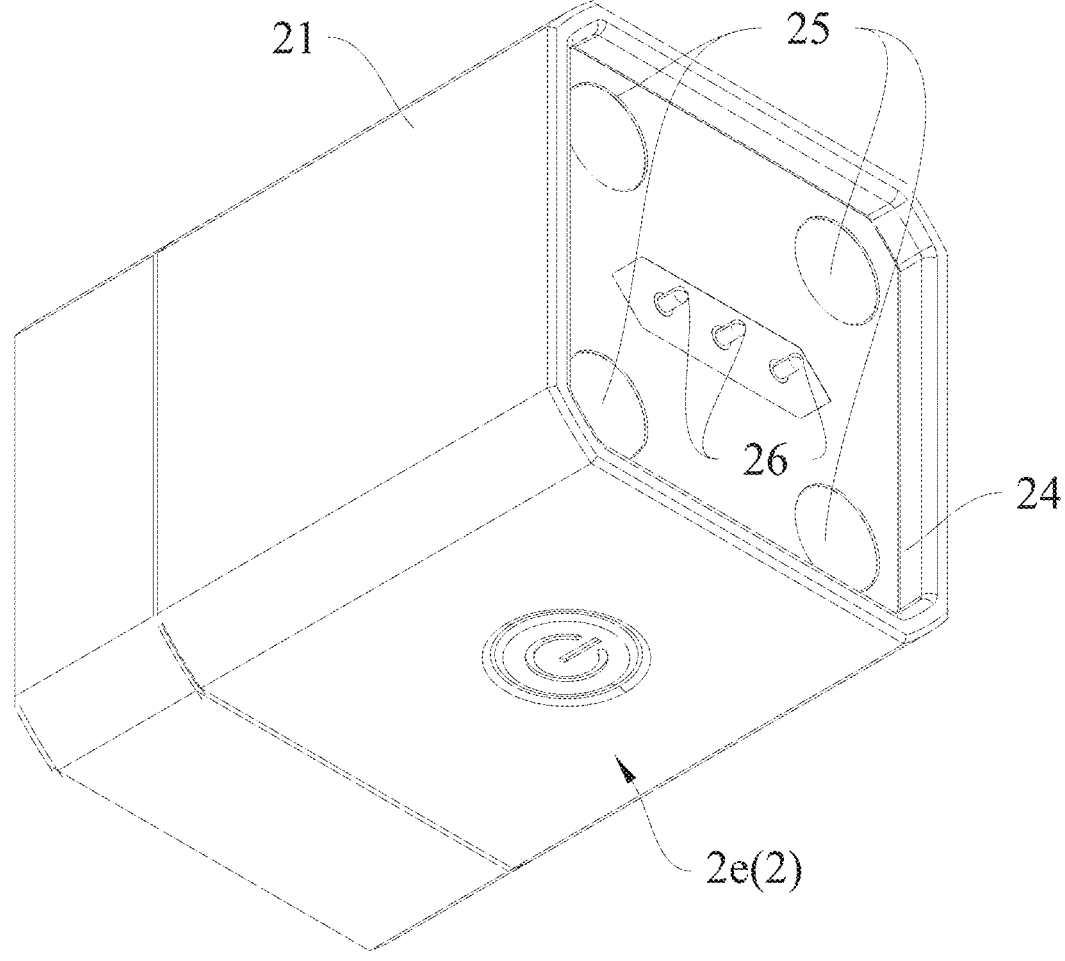
FIG. 16 is a perspective view of a pulse igniter module according to Embodiment 5 of the present disclosure.
Figure 17:
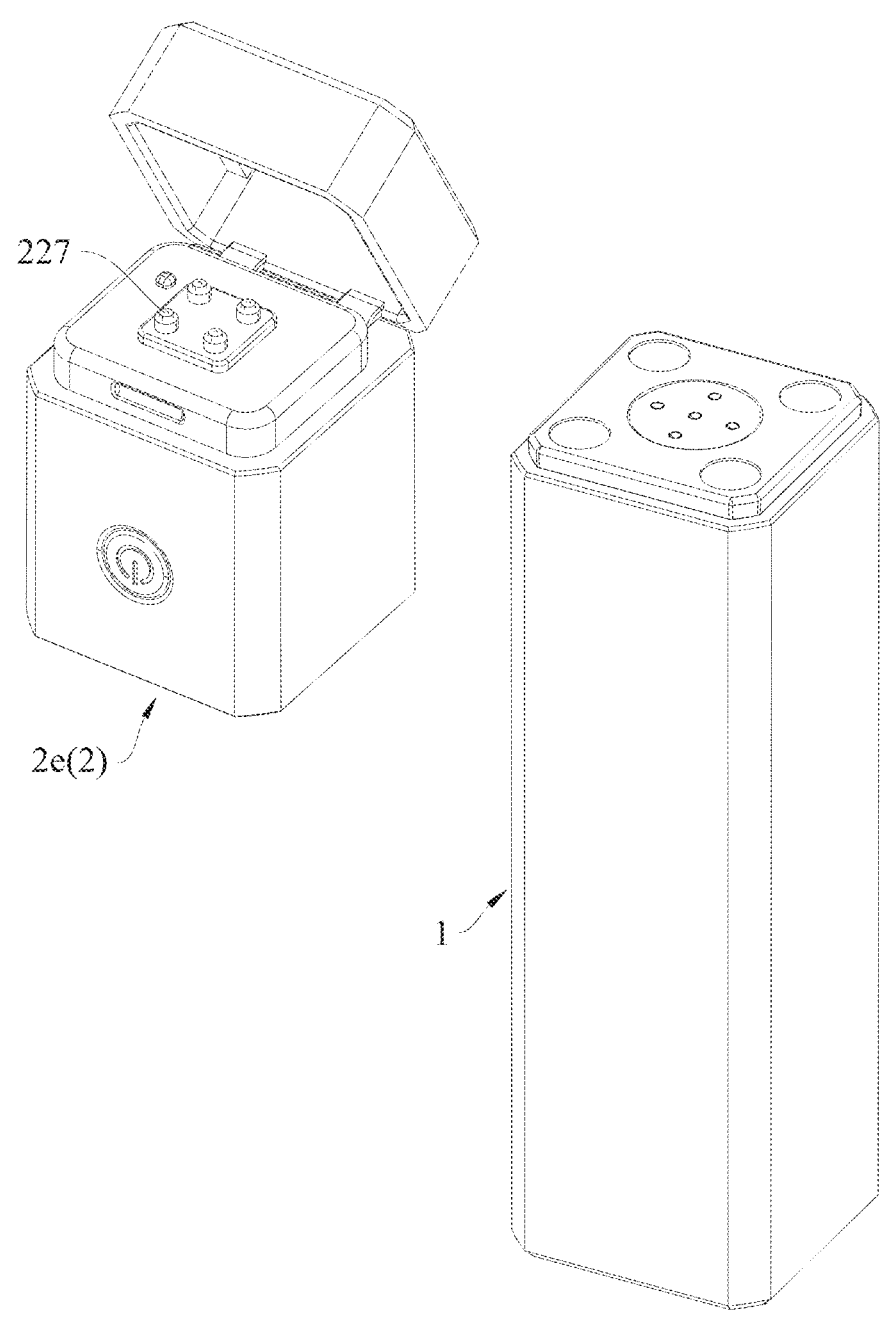
FIG. 17 is a perspective view of a pulse igniter module and a power module being disassembled according to Embodiment 5 of the present disclosure.
Figure 18:
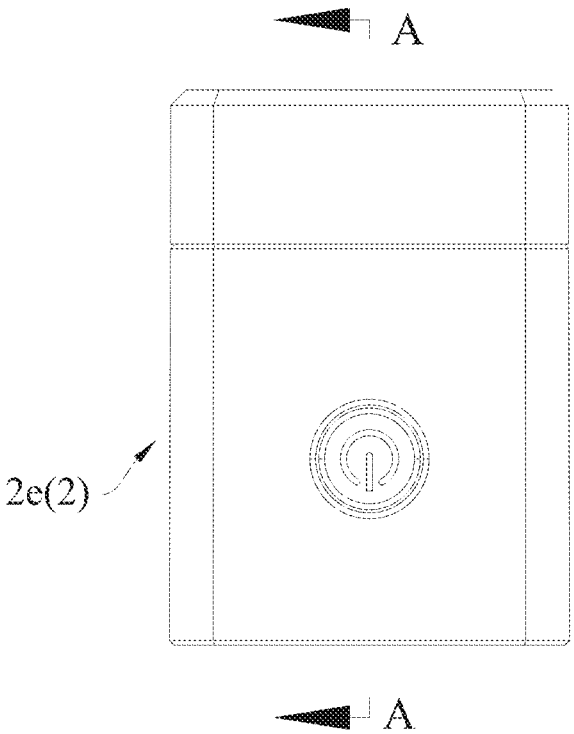
FIG. 18 illustrates a pulse igniter module and a cross-sectional view thereof taken along line A-A according to Embodiment 5 of the present disclosure.
Figure 18:
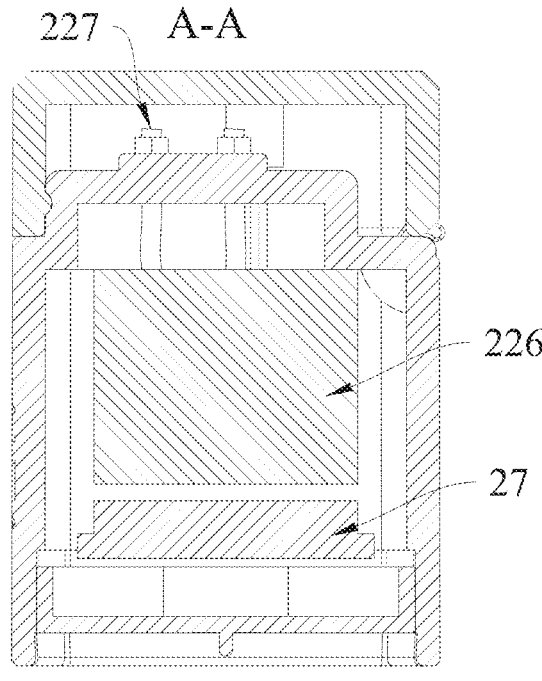

As shown in FIG. 16-FIG. 18, the electric module 2 includes a pulse igniter module 2*e* An electric member 22 in the pulse igniter module 2*e* further includes a high-voltage arc generator 226. The high-voltage arc generator 226 is electrically connected to a printed circuit board 27, and one end of the high-voltage arc generator 226 has an arc trigger point 227. The arc trigger point 227 is exposed outside the housing 21. The pulse igniter module 2*e* includes the high-voltage arc generator 226, the second mounting platform 23 adapted to the power module 1. The structure of a limit slot 24, a second set of magnetic blocks 25, electrode contacts 26 and the printed circuit board 27 is the same as the structure of the components on the second mounting platform 23 of Embodiment 1.

A high-voltage arc is generated by the high-voltage arc generator 226, which is capable of rapidly and reliably igniting a gas or liquid fuel. The exposed design of the arc triggering point 227 enables the user to complete the ignition without complicated operations, which enhances the convenience of use and user experience. There components are integrated in the electric member 22 and connected to the printed circuit board 27, realizing a compact design, reducing the overall size, and facilitating portability.

Embodiment 6

Figure 19:
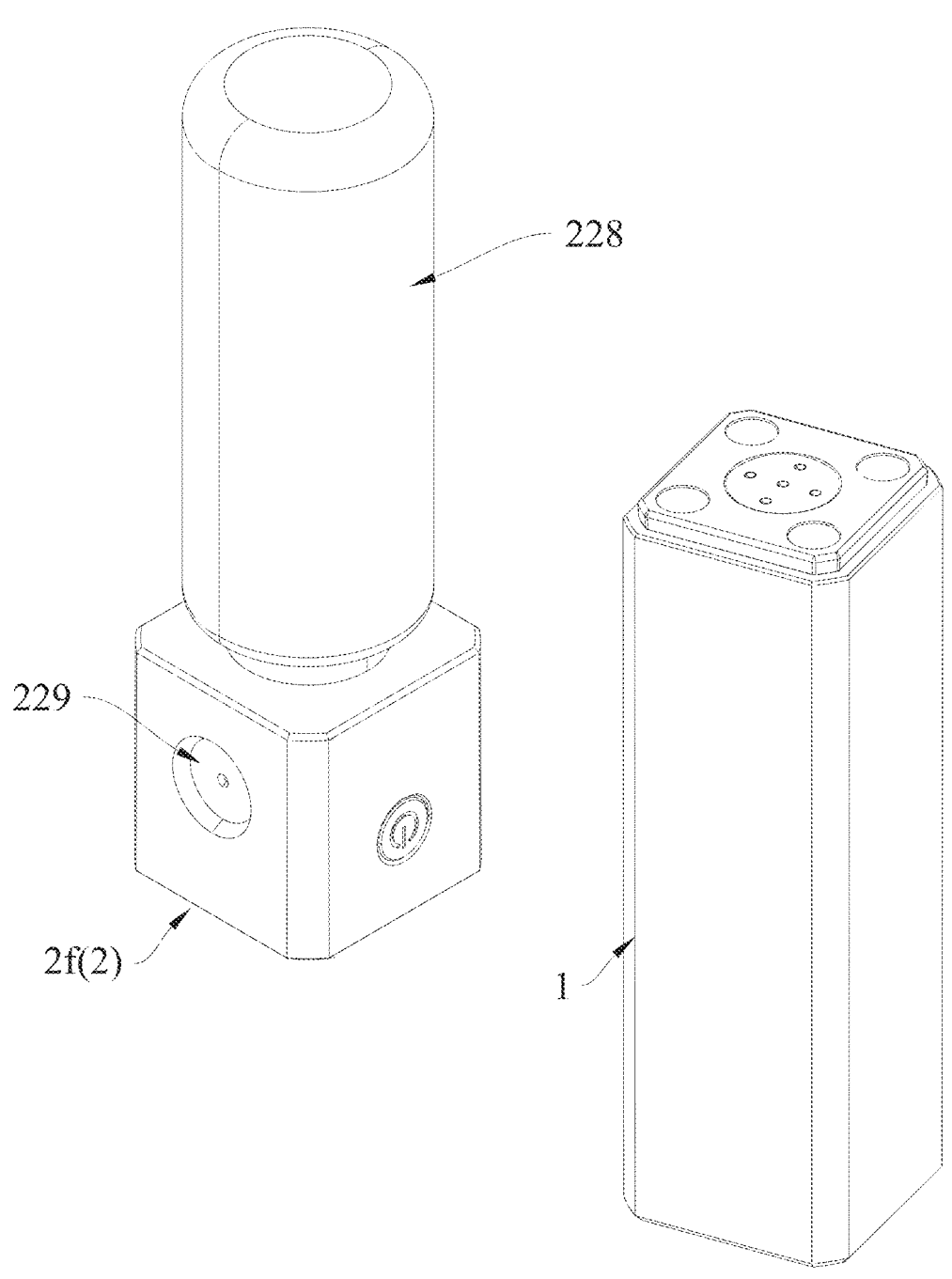
FIG. 19 is a perspective view of a humidifier module and a power module disassembled at a first angle according to Embodiment 6 of the present disclosure.
Figure 20:
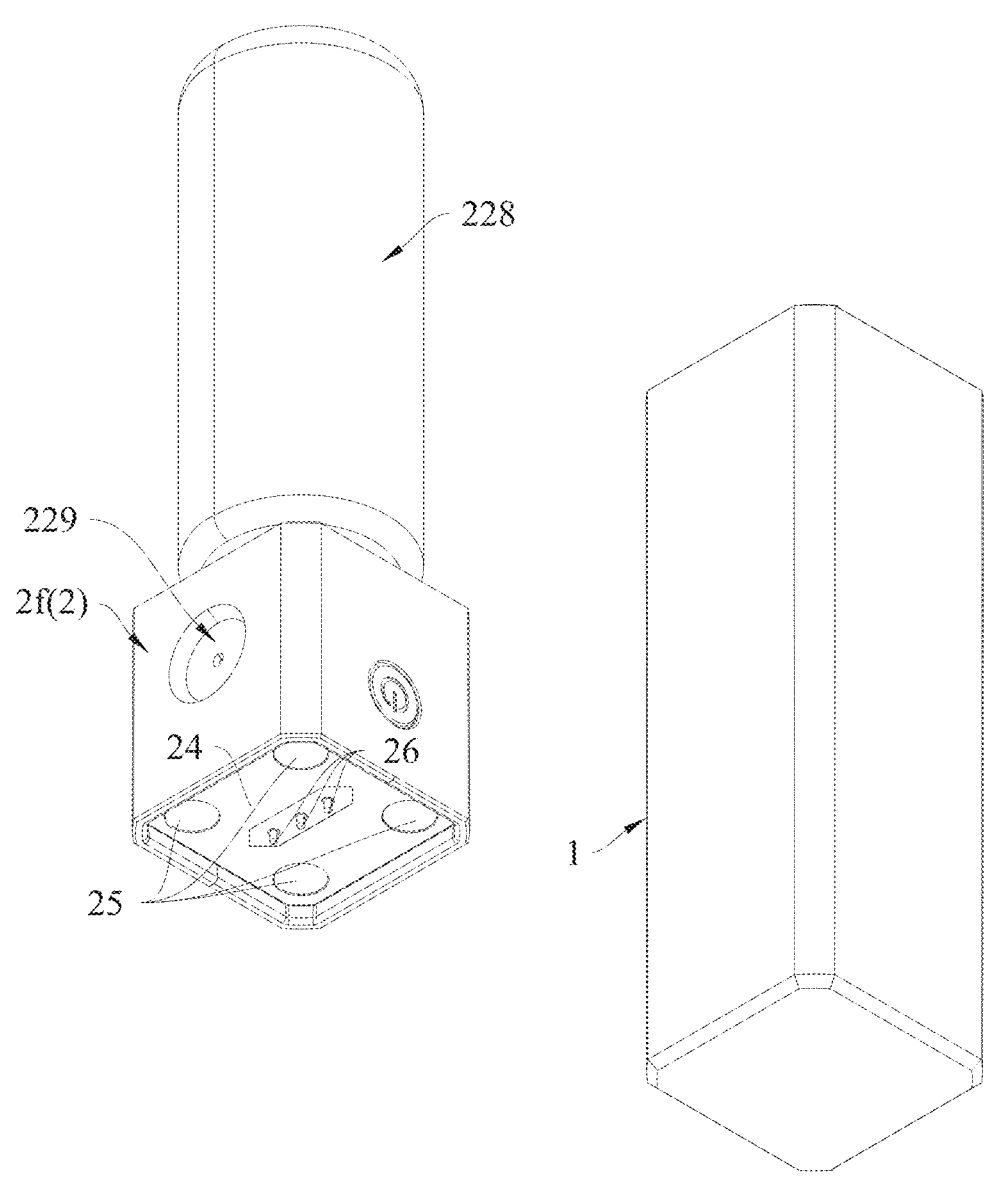
FIG. 20 is a perspective view of a humidifier module and a power module disassembled at a second angle according to Embodiment 6 of the present disclosure.

As shown in FIG. 19-FIG. 20, the electric module 2 includes a humidifier module 2*f*. The humidifier module 2*f* includes a housing 21 and an electric member 22 mounted inside the housing 21. The electric member 22 further includes a water storage container 228 for storing water, which serves as a working medium for an atomizing pump 229. The atomizing pump 229 is in communication with the water storage container 228. The atomizing pump 229 is in communication with the water storage container 228 through a pipe. The atomizing pump 229 converts water into a fine water mist. The atomizing pump 229 is electrically connected to the printed circuit board 27, and the printed circuit board 27 controls its working state, thereby achieving a precise control of the atomizing pump 229 Therefore, the humidification intensity can be adjusted as needed and improves the operational intelligence of the device. The humidifier module 2*f* includes the electric member 22, a second mounting platform 23 adapted to the power module 1, a limit slot 24, a second set of magnetic blocks 25, electrode contacts 26 and the Printed circuit board 27. The structures of the components on the second mounting platform 23 are the same as those of Embodiment 1.

Embodiment 7

Figure 21:
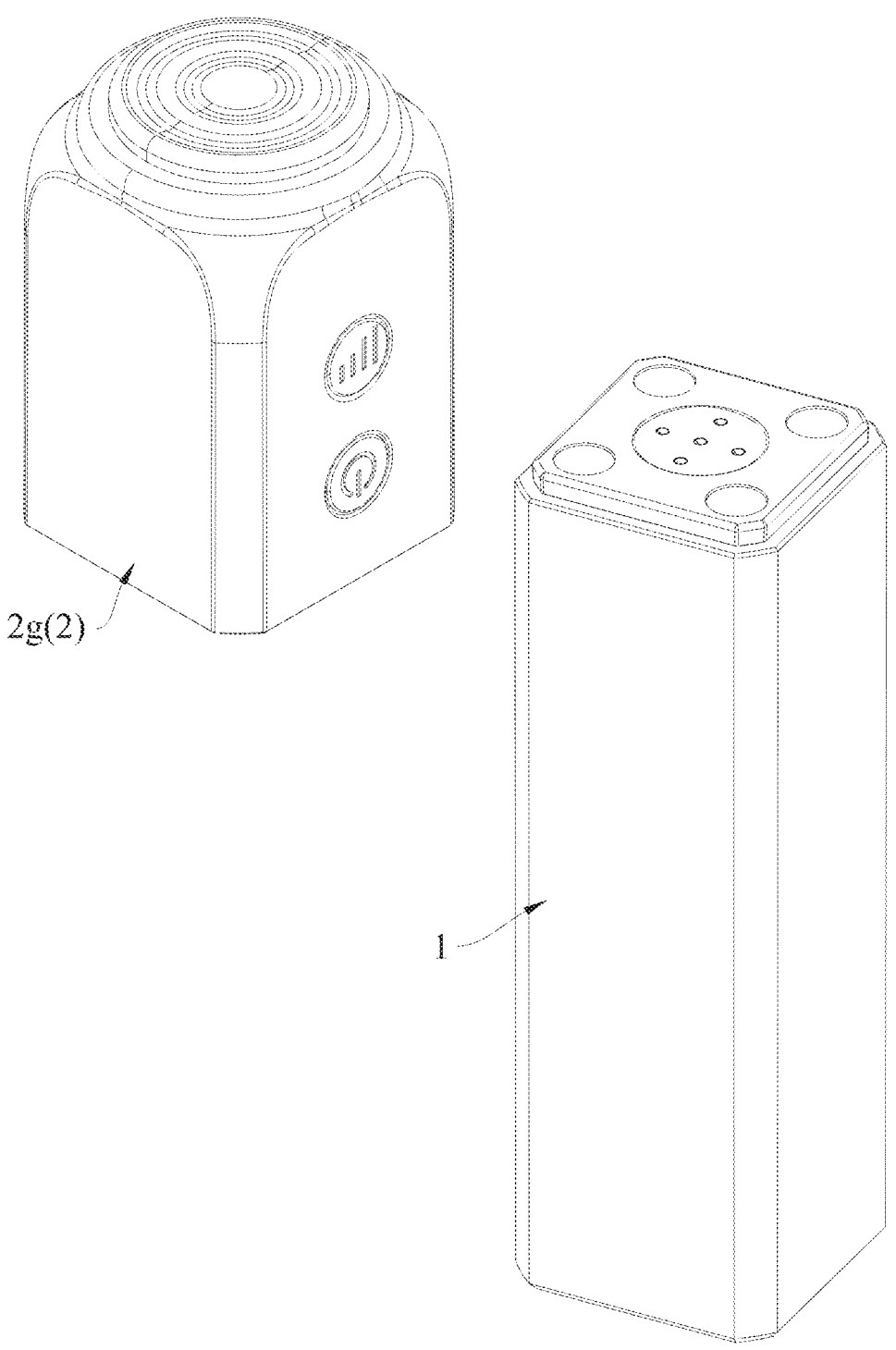
FIG. 21 is a perspective view of a massage module and a power module disassembled at a first angle according to Embodiment 7 of the present disclosure.
Figure 22:
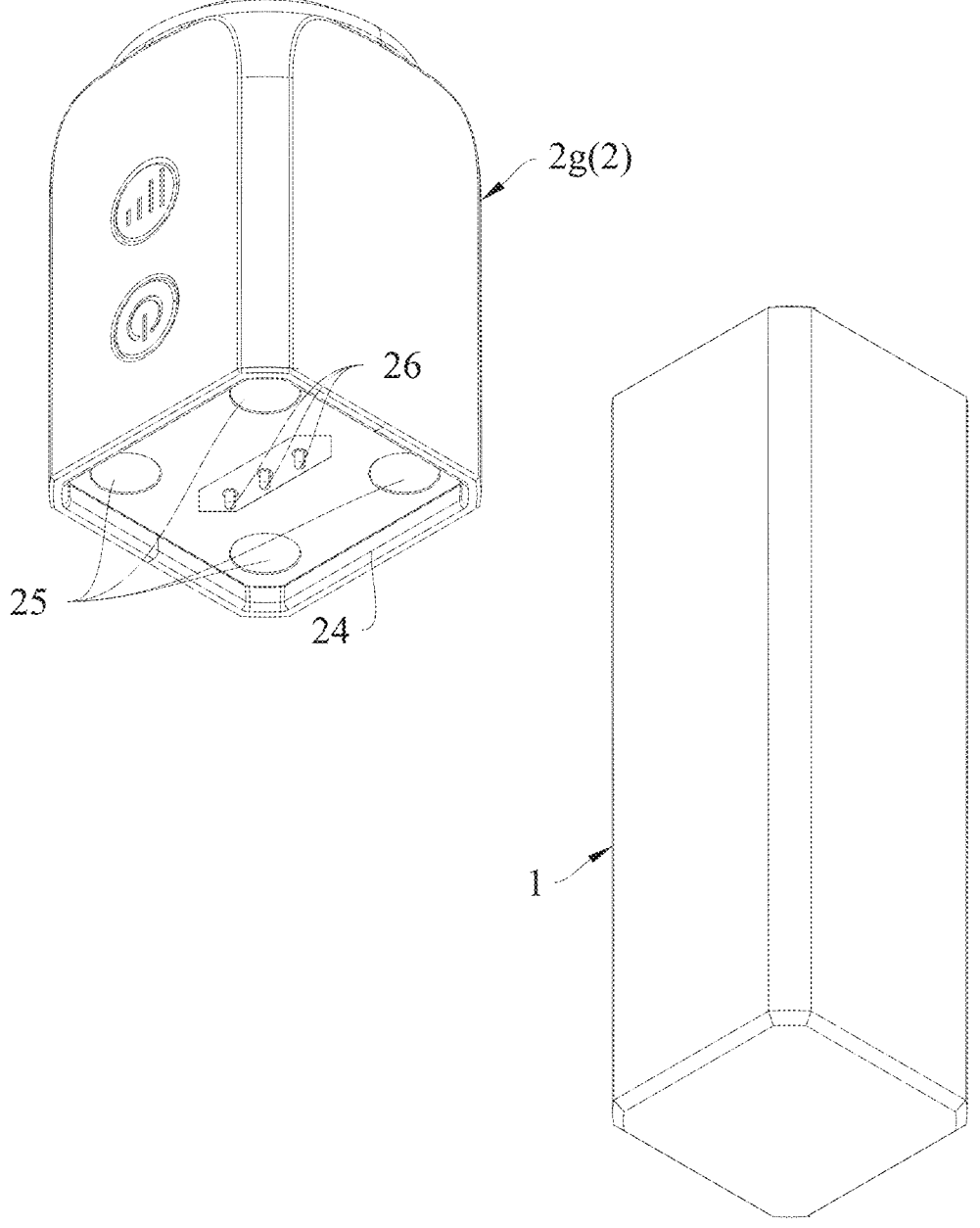
FIG. 22 is a perspective view of a massage module and a power module disassembled at a second angle according to Embodiment 7 of the present disclosure.
Figure 23:
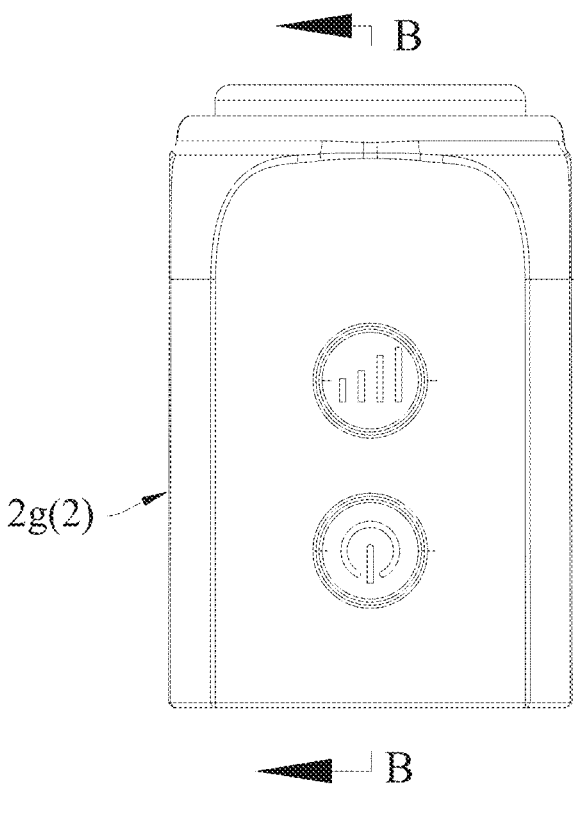
FIG. 23 is a massage module and a cross-sectional view thereof taken along line B-B according to Embodiment 7 of the present disclosure.
Figure 23:
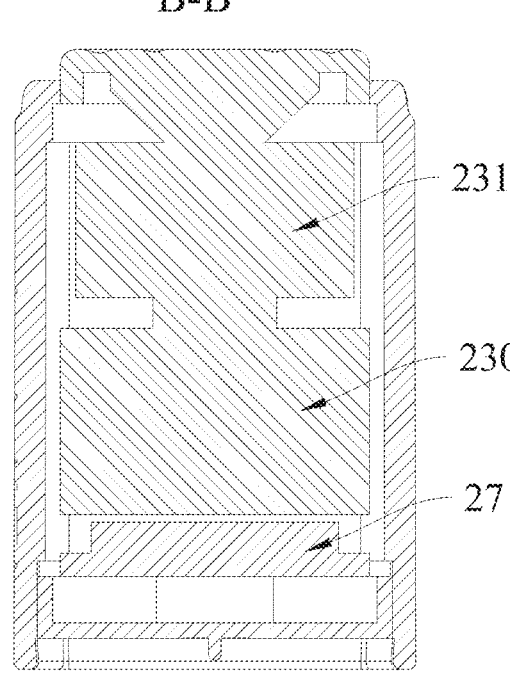

As shown in FIG. 21-FIG. 22, an electric member 22 in a massage module 2*g* includes an electric motor 230 for driving a massage head or other vibrating parts to provide a physical massage function, a heating module 231 configured to heat and add a thermal compress effect to the massage function, thereby enhancing skin care experience. Combining the physical massage function provided by the electric motor 230 and the thermotherapy function provided by the heating module 231 realizes a multi-dimensional care of the skin, which helps to promote blood circulation, relax the muscles, and improve the elasticity of the skin. The electric motor 230 and the heating module 231 are electrically connected to a printed circuit board 27, achieving a precise control of the electric motor 230 and the heating module 231. In this way, the massage strength and temperature can be adjusted according to the skin texture and needs of different users to ensure the best use effect. The structures of the massage module 2*g*, the second mounting platform 23 adapted to the power module 1, a limit slot 24, a second set of magnetic blocks 25, electrode contacts 26 and the printed circuit board 27 mounted on the second mounting platform 23 are the same as those of Embodiment 1.

In the above embodiment, magnetic coupling and mechanical positioning are performed by the electric module 2 to ensure the rigidity and reliability of the connection. Users only need to bring the electric module proximal to the power module to automatically complete the connection without complex alignment operations, greatly simplifying the installation process and enhancing user experience.

The design not only realizes multi-directional compatibility and reliable electrical connection, but also simplifies the installation process, enhances versatility, reduces contact resistance, and provides good protection performance, significantly improving the connection stability, ease of operation, and protection performance of the power module and its electrical appliance, and meeting the needs of portable electronic devices for power module 1.

This multi-directionally compatible design allows the power module 1 to be quickly and accurately docked with different types of electric modules 2, such as the first power transmission module 2*a*, the second power transmission module 2*b*; the flashlight module 2*c* or the fan module 2*d*, enhancing the system's expandability and adaptability.

The present disclosure solves the problem existing in the connection of traditional power modules and electrical appliances through the magnetic connection and securing structure. The present disclosure provides a more stable, reliable and convenient connection, having good waterproof and dustproof performance, featuring a multifunctional modular design, and improving user experience and product competitiveness. The quantity, position and arrangement of electrode interfaces and electrode contacts are carefully designed to ensure that they can be accurately aligned and contacted after each 90° rotation, thus ensuring the reliability of the electrical connection. This ensures fast and solid assembly between the two modules, avoiding the loosening or poor contact problems that may be caused by the traditional plug-in methods. The prismatic configuration of the battery compartment housing and the housing allows a user to easily rotate the electric module 90° relative to the power module by manual operation. This design simplifies the user's operation steps and improves the convenience of using the device.

The above description only illustrates some embodiments of the present disclosure, and does not limit the protection scope of the present disclosure. All equivalent structural changes made by using the contents in the specification and drawings under the concept of the present disclosure, or directly/indirectly used in other related technical fields are included in the protection scope of the present disclosure.

What is claimed is:

1. A handheld mobile device, comprising:
a power module and an electric module, the electric module comprising a housing;
the power module comprising:
a battery compartment housing;
a battery provided inside the battery compartment housing;
a plurality of electrode interfaces exposed at an end of the battery compartment housing, the plurality of electrode interfaces being electrically connected to the battery; and
a first set of magnetic blocks disposed at the end of the battery compartment housing;
wherein the electric module further comprises:
an electric member comprising a printed circuit board mounted in the housing of the electric module;
a plurality of electrode contacts, one end of each electrode contact of the plurality of electrode contacts being exposed outside the housing of the electric module and electrically connected to the electric member; and
a second set of magnetic blocks mounted on the housing of the electric module on a same side as the plurality of electrode contacts;
wherein the power module and the electric module are configured to be magnetically and electrically connected to form a circuit through the second set of magnetic blocks and the first set of magnetic blocks;
wherein the quantity of the plurality of electrode interfaces is at least two; the quantity of the plurality of electrode contacts is at least two; and
each electrode contact of the plurality of electrode contacts on the housing matches with one electrode interface of the plurality of electrode interfaces at a corresponding position in the battery compartment housing;
wherein each 90° rotation of the electric module allows at least two electrode interfaces of the plurality of electrode interfaces on the power module to be aligned with and contacted with at least two electrode contacts of the plurality of electrode contacts.

2. The handheld mobile device according to claim 1, wherein at least a portion of the battery compartment housing has a shape of a polygonal prism; at least a portion of the housing of the electric module has a shape of a prismatic cylinder; and at least two opposite edge lengths of the housing of the electric module are equal to an edge length of a cross-section of the polygonal prism of the battery compartment housing.

3. The handheld mobile device according to claim 1, wherein the battery compartment housing comprises a first mounting platform, and the plurality of the electrode interfaces are exposed on the first mounting platform; and the housing of the electric module comprises at least one second mounting platform, the plurality of the electrode contacts are exposed on the at least one second mounting platform.

4. The handheld mobile device according to claim 3, further comprising:
a limit bump, protruded on the first mounting platform; and
a limit slot, defined by the at least one second mounting platform;
wherein the limit slot is adapted to snap fit the limit bump.

5. The handheld mobile device according to claim 4, wherein the plurality of electrode interfaces is exposed on an outer surface of the limit bump:
one end of each electrode contact of the plurality of electrode contacts extends from the at least second mounting platform towards an outside of the limit slot, and another end of each electrode contact of the plurality of electrode contacts is electrically connected to the printed circuit board.

6. The handheld mobile device according to claim 1, wherein at least a portion of the battery compartment housing has a shape of a square prism; at least a portion of the housing of the electric module has a shape of a square prism, and at least two opposing edge lengths of the housing of the electric module are equal to an edge length of a cross-section of the square prism of the battery compartment housing.

7. The handheld mobile device according to claim 6, wherein the quantity of the plurality of electrode interfaces is five, four electrode interfaces of the plurality of electrode interfaces are symmetrically distributed around a center of the fifth electrode interface of the plurality of electrode interfaces to form a square; and
the quantity of the plurality of electrode contacts is three, the plurality of electrode contacts is arranged in a line, each 90° rotation of the electric module allows three electrode interfaces of the plurality of electrode interfaces on the power module to be aligned with and contacted with three electrode contacts of the plurality of electrode contacts.

8. The handheld mobile device according to claim 4, wherein the limit bump has a square cross-section; the limit slot is recessed and has a square cross-section configured for fitting with the limit bump.

9. The handheld mobile device according to claim 7, wherein the plurality of the first set of magnetic blocks is symmetrically distributed along a center of an end surface of the battery compartment housing.

10. The handheld mobile device according to claim 9, wherein a quantity and position of the second set of magnetic blocks corresponds to a quantity and position of the first set of magnetic blocks to allow the second set of magnetic blocks to be magnetically coupled with the first set of magnetic blocks.

11. The handheld mobile device according to claim 1, wherein the electric module comprises one or a combination of:

a power transmission module;

a flashlight module;

a fan module;

a pulse igniter module;

a humidifier module; and a massage module.

12. The handheld mobile device according to claim 11, wherein the electric member in the power transmission module further comprises:

a USB interface assembly and a Type-C interface assembly configured to charge and supply a power interface for an external device; and a display light configured to show a status of an electrical pathway;

the display light, the USB interface assembly, and the Type-C interface assembly are integrated and electrically connected to the printed circuit board.

13. The handheld mobile device according to claim 11, wherein the electric member in the flashlight module further comprises:

a light bulb assembly, wherein the light bulb assembly comprises a light bulb integrated and electrically connected to the printed circuit board.

14. The handheld mobile device according to claim 11, wherein the electric member in the fan module further comprises a fan assembly, a fan in the fan assembly is electrically connected to the printed circuit board.

15. The handheld mobile device according to claim 11, wherein the electric member in the pulse igniter module further comprises a high-voltage arc generator, the high-voltage arc generator is electrically connected to the printed circuit board, the high-voltage arc generator has an arc trigger point at one end, and the arc trigger point is exposed outside of the housing of the electric module.

16. The handheld mobile device according to claim 11, wherein the electric member in the humidifier module further comprises:

a water storage container; and an atomizing pump in communication with the water storage container;

wherein the atomizing pump is electrically connected to the printed circuit board.

17. The handheld mobile device according to claim 11, wherein the electric member in the massage module further comprises an electric motor and a heating module; and the electric motor and the heating module are electrically connected to the printed circuit board.

18. The handheld mobile device according to claim 9, wherein the quantity of the first set of magnetic blocks is at least four; a connecting line of two magnetic blocks of the first set of magnetic blocks symmetrically distributed along the center of the end surface of the battery compartment housing is perpendicular to a connecting line of two other magnetic blocks of the first set of magnetic blocks symmetrically distributed along the center of the end surface of the battery compartment housing.

\* \* \* \* \*